United States Patent [19]

Oliver et al.

[11] Patent Number: 5,040,159

[45] Date of Patent: Aug. 13, 1991

[54] MECHANICAL SENSE OF TOUCH IN A CONTROL SYSTEM

[75] Inventors: Thomas C. Oliver; Mark E. Wanger; Donald J. Stavely; Jennifer L. Methlie; Mark J. Bianchi, all of Fort Collins; Rick A. Kato, Greeley; Kraig A. Proehl, Loveland, all of Colo.

[73] Assignee: Hewlett-Packard Company, Palo Alto, Calif.

[21] Appl. No.: 326,146

[22] Filed: Mar. 20, 1989

[51] Int. Cl.⁵ ............................................. G11B 17/22
[52] U.S. Cl. ........................................ 369/34; 369/58; 369/75.2; 369/178; 369/233
[58] Field of Search ....................... 369/30, 33, 34, 56, 369/58, 75.2, 178, 196, 199, 200, 233, 35, 36; 901/9

[56] References Cited

U.S. PATENT DOCUMENTS

| | | | |
|---|---|---|---|
| 4,123,066 | 10/1978 | Minemura et al. | 369/200 |
| 4,504,936 | 3/1985 | Faber et al. | 369/34 |
| 4,567,584 | 1/1986 | Kawakami | 369/36 |
| 4,608,679 | 8/1986 | Rudy et al. | 369/36 |
| 4,614,474 | 9/1986 | Sudo | 369/178 X |
| 4,782,473 | 11/1988 | Masaki | 369/34 |
| 4,787,074 | 11/1988 | Deck et al. | 369/36 |
| 4,815,056 | 3/1989 | Toi et al. | 369/36 |
| 4,817,071 | 3/1989 | Carlson et al. | 369/36 |

FOREIGN PATENT DOCUMENTS

| | | | |
|---|---|---|---|
| 0256956 | 12/1985 | Japan | 369/35 |
| 0256957 | 12/1985 | Japan | 369/35 |
| 0256959 | 12/1985 | Japan | 369/36 |
| 0256960 | 12/1985 | Japan | 369/35 |
| 0094462 | 4/1988 | Japan | 369/36 |
| 0112859 | 5/1988 | Japan | 369/36 |

OTHER PUBLICATIONS

*Robotics: Control, Sensing, Vision, and Intelligence,* K. S. Fu et al.
McGraw-Hill Book Company, Copyright 1987 pp. 205-222.
*Feedback Control of Dynamic Systems,* Franklin et al.
Addision-Wesley Publishing Company, Copyright 1986, pp. 31-38.

*Primary Examiner*—Benjamin R. Fuller
*Assistant Examiner*—Randy W. Gibson

[57] ABSTRACT

Disclosed is an optical disk handling system, called an autochanger, having two control systems to provide the six motions necessary to move optical disk cartridges from storage holding cells to an optical drive. The system uses shaft encoders on the motors of the two control systems, and current or votlage feedback from the motors, for all positioning, and for detecting the location of the mechanisms during and at the end of moves. The shaft encoders are used to position a mechanism close to the eventual move location, then motor current or voltage feedback is used to determine opposition to the movement to the mechanism, which informs the control system as to whether the mechanism has reached its destination. An important aspect of the invention is that the motor current or voltage feedback is used by one control system to provide five of the six motions.

15 Claims, 23 Drawing Sheets

MECHANICAL SENSE OF TOUCH IN A CONTROL SYSTEM

BACKGROUND OF THE INVENTION

This invention relates to computer systems and more particularly to an apparatus for handling and storing optical disk cartridges. Even more particularly this invention relates to detecting the position of moving mechanisms within the control system of such apparatus.

An optical disk is a data storage medium which is readable by a laser-based reading device. Optical disks known as "compact disks" or "CDs" have become increasingly popular during the past few years for recording music and audio-visual works. Due to the huge storage capacity of optical disks as compared to conventional magnetic storage media, optical disks known as "ROM disks" have become popular for storing computer readable information. Recent technology has produced optical disks which can be written as well as read by the computer, thus, in the future optical disks are expected to become increasingly more important in the computer industry and may eventually replace magnetically readable and writable storage media such as "floppy disks" and "hard disks." Another recent development, the ability to provide data storage on both surfaces of an optical disk, has effectively doubled the optical disk storage capacity.

Optical disks of the type used in computer applications are generally mounted in cartridges, and the reading devices generally read or write data through a slot provided on a surface of the cartridge. Currently, most optical disks are hand-inserted into disk readers. However, for large databases consisting of many optical disks, it is preferable, and perhaps essential, to provide an optical disk storage system for storing the disks at known locations, and an optical disk handling system which is capable of retrieving a desired disk from a storage location and inserting the disk into an optical disk reader. In a disk storage system wherein the stored disks and an associated disk reader are arranged in a longitudinally extending, two-dimensional array consisting of vertically extending columns and laterally extending rows, it is necessary for a disk handling system to be capable of engaging a disk, moving it vertically, laterally, and longitudinally and then releasing it in order to remove it from storage, move it into aligned relationship with the disk reader, and insert it into the disk reader. It may further be necessary for the disk handling system to flip the disk to reverse the side thereof which will be positioned in readable relationship with a reader. It may also be necessary to reorient a disk at the time it is initially inserted into the system by an operator.

In order to decrease production and maintenance costs and to increase reliability of such a disk handling system, it is generally desirable to reduce the number of separate control systems to a minimum. It is also desirable to minimize the use of sensing devices which are particularly subject to malfunction such as, for example, photoelectric or magnetic proximity sensors. It is also desirable to minimize the mounting of sensors or motors on moving system components to eliminate problems associated with moving lead wires, etc.

There is need in the art then for a system that detects the location of its mechanisms using a minimum number of sensors. There is a further need for such a system that performs such detection using sensors that are not mounted on moving mechanisms. A still further need is for a system that detects obstructions without a separate sensor for such detection. Another need is for a system that will detect the presence of a cartridge without a separate sensor for such detection. Still another need is for a system to detect the location of its mechanisms by monitoring the force being exerted by such mechanism.

Various features and components of such a cartridge handling system are disclosed in U.S. patent applications:

(A) U.S. patent application Ser. No. 278,102 filed 11/30/88 for OPTICAL DISK HANDLING APPARATUS WITH FLIP LATCH of Methlie, Oliver, Stavely and Wanger;

(B) U.S. patent application Ser. No. 288,608 filed 12/22/88 for OPTICAL DISK INSERTION APPARATUS of Christie, Wanger, Dauner, Jones and Domel;

(C) U.S. patent application Ser. No. 298,388 filed 01/18/89 for LATERAL DISPLACEMENT CONTROL ASSEMBLY FOR AN OPTICAL DISK HANDLING SYSTEM of Wanger, Methlie, Stavely and Oliver; and (D) U.S. patent application Ser. No. 305,898 filed 02/02/89 for OPTICAL DISK CARTRIDGE HANDLING APPARATUS WITH PASSIVE CARTRIDGE ENGAGEMENT ASSEMBLY of Wanger, Methlie, Jones and Stavely;

(E) U.S. patent application Ser. No. 314,012 filed 02/22/89 for CARTRIDGE HANDLING SYSTEM of Wanger, Methlie, Christie, Dauner, Jones, Oliver, and Stavely, which are each hereby specifically incorporated by reference for all that is disclosed therein.

SUMMARY OF THE INVENTION

It is an object of the present invention to detect the location of a mechanism within a control system by monitoring the force being exerted by a motor of the system.

It is another object of the present invention to detect the location of a mechanism at any given point within a control system by using only shaft encoder sensors.

Still another object of the invention is to select the control system compensator values based upon the plant parameters of the particular mechanism being moved.

Another object of the invention is to calculate the forces being exerted by the control system.

Another object is to detect obstructions in the system by monitoring the forces being exerted by the system.

Yet another object is to detect completion of an operation of the control system by monitoring the force being exerted.

Another object of the invention is to adjust the movements of the motors of the control system until a desired force or opposition is obtained.

Another object is to detect a cartridge in a storage location by the amount of opposition encountered when the mechanism is moved to the storage location.

The above and other objects are accomplished in an optical disk handling system, called an autochanger, having two control systems to provide the six motions necessary to move optical disk cartridges from a storage holding unit array, or cells, to an optical disk reading device, or optical drive. The optical drive, located in the array of cells, reads or writes data on an optical disk in the cartridge. After the reading or writing operation, the cartridge is replaced in its original cell. The system uses shaft encoders on two motors of the two control systems, and current or voltage feedback from the motors, for all positioning and for detecting the location of the mechanisms during, and at the end of, moves. The shaft encoders are used to position a mechanism close to the eventual move location, then motor current or voltage feedback is used to determine the opposition to the movement of the mechanism. This opposition, depending on the particular target location, tells the control system whether the mechanism has reached its destination. The amount of opposition is tested to certain limits such that too little opposition means the movement is not complete whereas too much opposition means an obstacle has been encountered.

A human operator can enter a cartridge into the system through a cartridge insertion assembly, or mailslot. Each time an operator enters a cartridge into the mailslot, the control systems rotate the mailslot to receive the cartridge, then move the cartridge either to a cell or the optical drive as requested by the host computer system connected to the autochanger. Cartridges can also be moved from the optical drive or cells to the mailslot and then rotated for removal by the operator.

Data can be located on either side of the optical disk within a cartridge. The control systems use a flip assembly in the autochanger to turn the cartridge over, allowing either side of the disk to be arranged for reading or writing by the optical drive.

The cells are organized into two columns. The control systems use a lateral displacement assembly to move a cartridge from a cell in one column to a cell in the other column, or to move a cartridge between the optical drive, which is located in one of the columns, to a cell in the other column. Also, the mailslot is located in one of the columns, so the control systems use the lateral displacement assembly to move a cartridge from the mailslot to the other column.

The control systems use a cartridge engaging assembly to attach to an exposed end portion of a cartridge positioned in a cell or the optical drive. A longitudinal displacement assembly is used by the control systems to move the cartridge, after attachment, out of the cell or optical drive. After positioning the cartridge vertically and laterally, the longitudinal displacement assembly is then used to move the cartridge into a cell or the optical drive, where the engaging assembly releases the cartridge. Together the cartridge engaging assembly and the longitudinal displacement assembly form an assembly called the transport.

An important aspect of the present invention is that the longitudinal displacement assembly, the flip assembly, the lateral displacement assembly, the engagement assembly, and the insertion assembly are operated by one of the two control systems. The other of the two control systems is used for vertical displacement of the cartridge. The two control systems use control motor shaft encoders and current and voltage feedback to control the force applied by the motors, at specific locations in the system, to operate the various mechanisms.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

Figure 1:
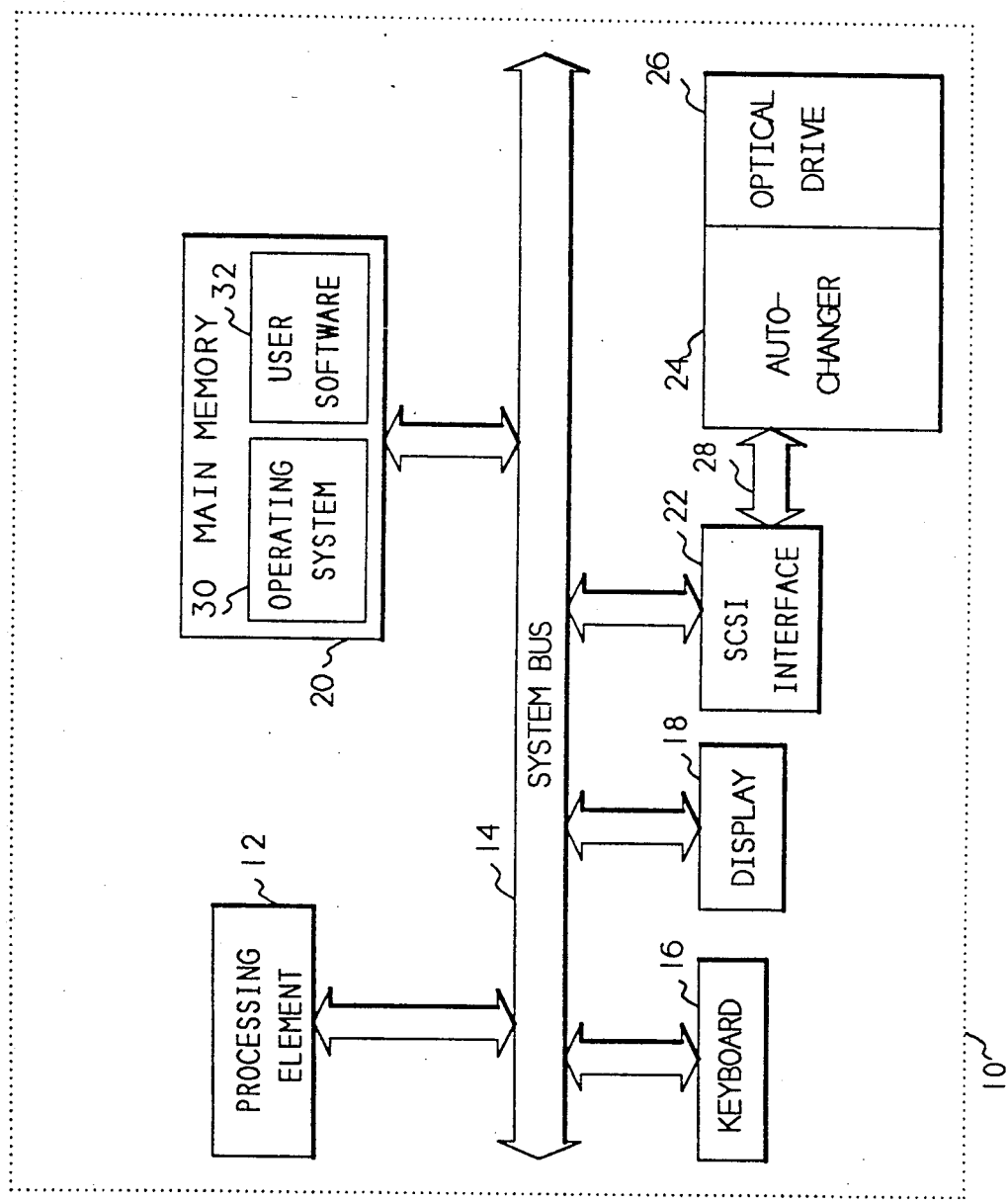
FIG. 1 shows a block diagram of a computer system incorporating the present invention.

The following description is of the best presently contemplated mode of carrying out the present invention. This description is not to be taken in a limiting sense but is made merely for the purpose of describing the general principles of the invention. The scope of the invention should be determined by referencing the appended claims.

The optical disk handling system ("autochanger") of the present invention uses two control systems to provide the six motions necessary to move optical disk cartridges from a storage holding unit array ("cells") to an optical disk reading device ("optical drive"). The optical drive, also located in the array, reads or writes data on an optical disk in the cartridge. After the reading or writing operation, the cartridge is replaced in its original cell. A human operator can enter a cartridge into the system through a cartridge insertion assembly ("mailslot"). Each time an operator enters a cartridge into the mailslot, the control systems move the cartridge either to a cell or the optical drive as requested by the host computer system connected to the autochanger. Cartridges can also be moved from the optical drive or cells to the mailslot for removal by the operator.

Data can be located on either side of the optical disk within a cartridge. The control systems use a flip assembly in the autochanger to turn the cartridge over, allowing either side of the disk to be arranged for reading or writing by the optical drive.

The cells are organized into two columns. The control systems use a lateral displacement assembly to move a cartridge from a cell in one column to a cell in the other column, or to move a cartridge between the optical drive, which is located in one of the columns, to a cell in the other column. Also, the mailslot is located in one of the columns, so the control systems use the lateral displacement assembly to move a cartridge from the mailslot to the other column.

The control systems use a cartridge engaging assembly to attach to an exposed end portion of a cartridge positioned in a cell or the optical drive. A longitudinal displacement assembly is used by the control systems to move the cartridge, after attachment, out of the cell or optical drive. After positioning the cartridge vertically and laterally, the longitudinal displacement assembly is then used to move the cartridge into a cell or the optical drive, where the engaging assembly releases the cartridge. Together the cartridge engaging assembly, the longitudinal displacement assembly, and the lateral displacement assembly form an assembly called the transport.

The mailslot is designed to allow an operator to insert a cartridge in a direction which is very convenient for the operator. The control systems then rotate the cartridge, in the mailslot, so that when the cartridge is engaged it is in a position for insertion into a cell or the optical drive. When ejecting a cartridge, it is rotated in the opposite direction for easy removal by the operator.

An important aspect of the present invention is that the longitudinal displacement assembly, the flip assembly, the lateral displacement assembly, the engagement assembly, and the insertion assembly are operated by one of the two control systems. The other of the two control systems is used for vertical displacement of the cartridge. The two control systems use motor shaft encoders and current and voltage feedback to control the force applied by the motors, at specific locations in the system, to operate the various assemblies.

A more complete description of the mechanical aspects of the autochanger may be had by referencing the aforementioned patent application (E).

Referring now to FIG. 1, a block diagram of the environment of the present invention is shown. A computer system 10 has a processing element 12 connected to a system bus 14. The processing element 12 receives instructions from a main memory 20 via the system bus 14 and communicates with a human operator using a keyboard 16 for input and a display 18 for output. An interface 22, which is a Small Computer System Interface (SCSI), connects the autochanger 24, via a bus 28, with the computer system 10. The autochanger 24 contains an array of cells for holding a plurality of optical disk cartridges. Each cartridge contains an optical disk which is used for data storage. Incorporated within the autochanger 24 is an optical drive 26, used for reading and writing data on the optical disks within the cartridges. The optical drive 26 is also attached to the system bus 14 through the SCSI interface 22 for transferring data between the drive 26 and the main memory 20 under control of the processing element 12.

The main memory 20 holds the programming instructions of the computer system 10, including an operating system 30 and user software 32. The operating system 30 and the user software 32 combine to control the selection of cartridges within the autochanger 25, and the reading and writing of data by the optical drive 26.

Figure 2:
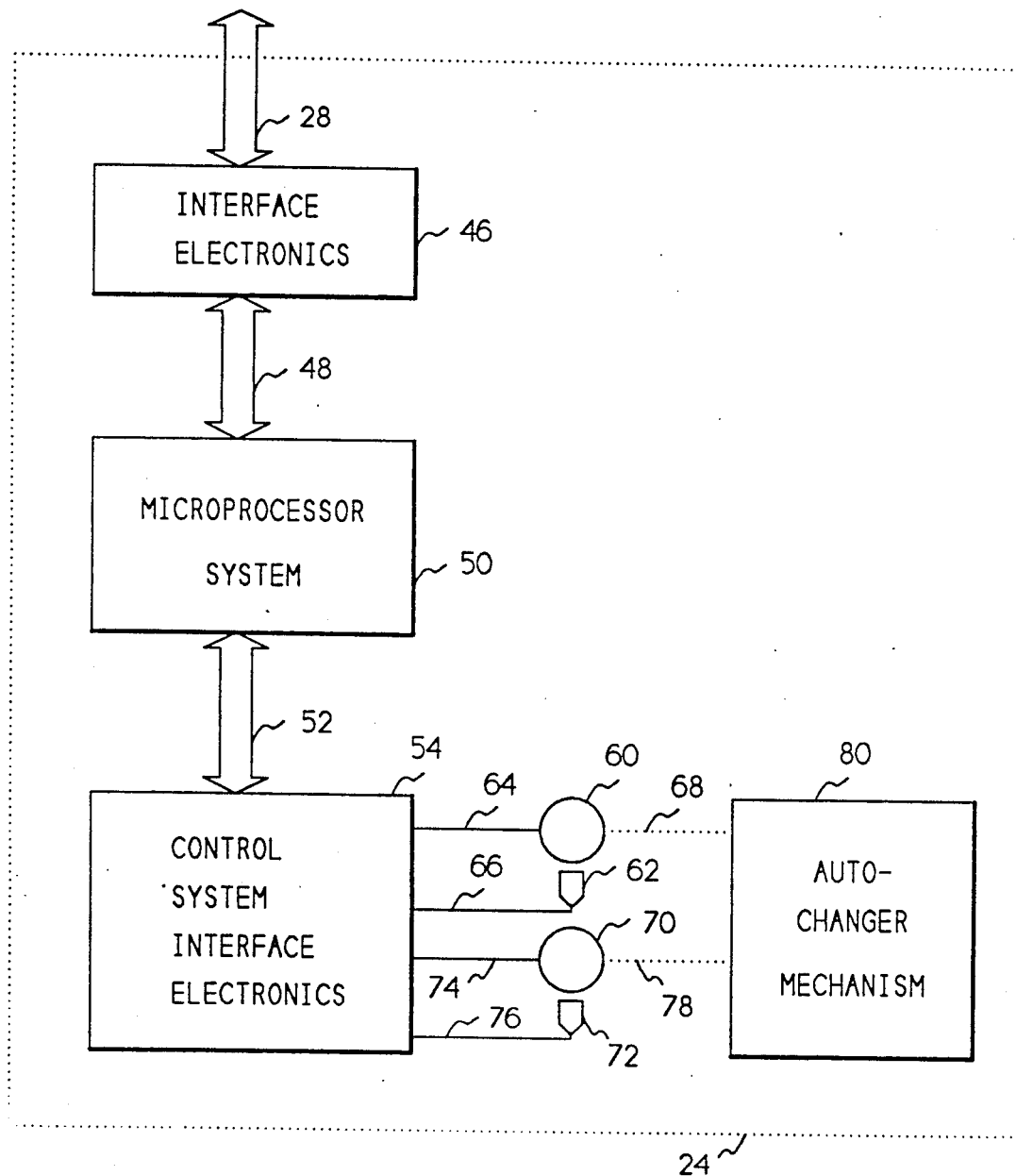
FIG. 2 shows a high level block diagram of the electronics of the present invention.

FIG. 2 shows a high level block diagram of the autochanger 24. An interface bus 28 connects the interface 22 (FIG. 1) to the autochanger interface electronics 46. A microprocessor system 50 connects to the interface 46 through a bus 48. The microprocessor 50 also connects to control system electronics 54 through a bus 52. The microprocessor 50 receives commands from the computer system 10 (FIG. 1) through the bus 28, interface 46, and bus 48. These commands direct the autochanger 24 to move cartridges between cells and the optical drive 26 as well as enter and eject cartridges through the mailslot (not shown). The microprocessor performs these commands by directing two control systems within the autochanger. The control systems have interface electronics 54 which are connected to two motors to drive the mechanical assemblies of the autochanger. The electronics 54 drives a first motor 60 through a pair of connections 64 and receives positional feedback from a shaft encoder 62 via signals 66. The motor 60 is mechanically connected to the autochanger mechanical assemblies 80 through a motor shaft 68. The electronics 54 also drives a second motor 70 through connections 74 and receives positional feedback from a shaft encoder 72 via signals 76. This second motor is mechanically connected to the autochanger mechanical assemblies 80 through a motor shaft 78.

Figure 2A:
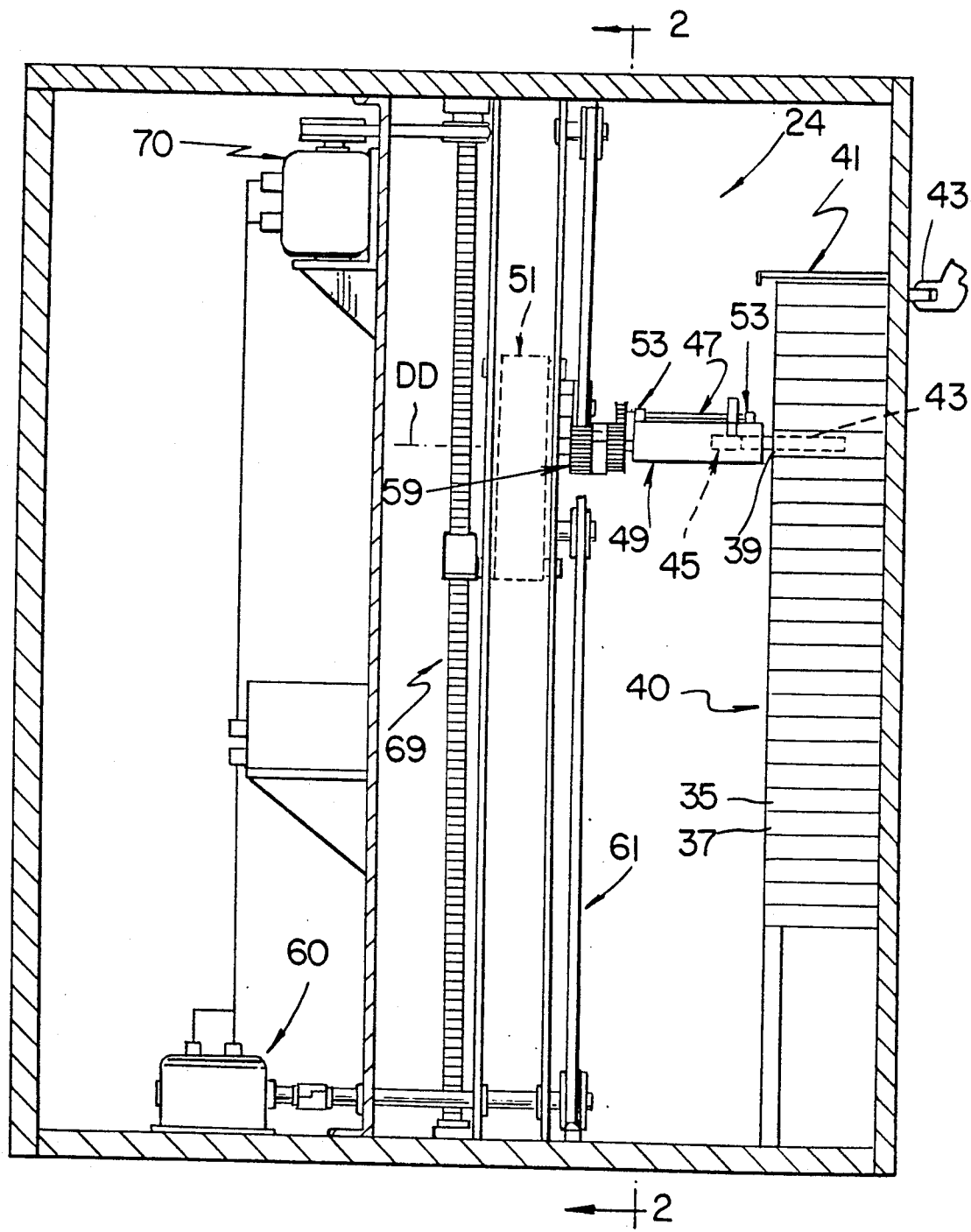
FIGS. 2A and 2B show the mechanical assemblies of the present invention.
Figure 2B:
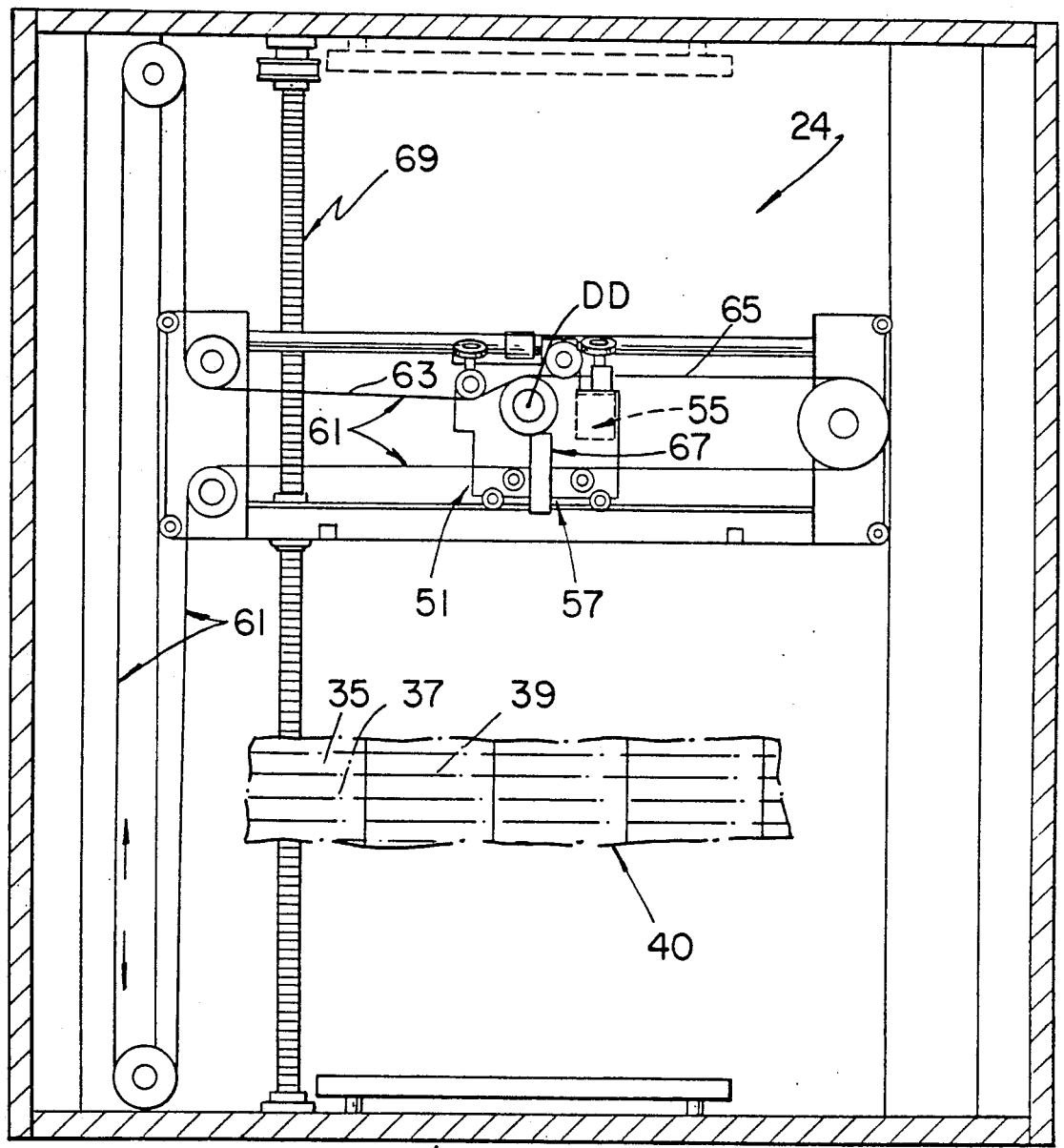

FIGS. 2A and 2B illustrate the mechanical assemblies or mechanisms of the optical disk cartridge handling system 24 for use in association with a plurality of longitudinally extending, rearwardly opening, cells 35, 37, 39, etc., arranged in a laterally and vertically extending cell array 40.

The handling system 24 may comprise an insertion assembly 41 for receiving a cartridge 43 which is hand-inserted by a human operator with a first end of the cartridge positioned forwardly. The insertion assembly longitudinally and rotationally displaces the cartridge so as to present the cartridge to a cartridge engaging mechanism with the first end of the cartridge positioned towards the rear of the housing.

The cartridge engaging mechanism 45 is provided for engaging an exposed end portion of a cartridge positioned in the insertion assembly 41 or in another cell, e.g. 35, 37, 39.

A longitudinal displacement assembly 47 is operatively associated with the engaging mechanism for longitudinally displacing a cartridge 43 engaged by the engaging mechanism 45.

A flipping assembly 49 is operatively associated with the engaging assembly 45 and is used for invertingly rotating a cartridge engaged by the engaging mechanism about a longitudinally extending flip axis DD.

A lateral displacement assembly 51 is operatively associated with the engaging assembly 45 for laterally displacing a cartridge 43 engaged by the engaging mechanism.

A rotatable first motor assembly 60 is drivingly linked to the longitudinal displacement assembly 43, the flipping assembly 49, and the lateral displacement assembly 51 for providing driving force thereto.

Stop assembly 53 may be provided which limits the movement of the longitudinal displacement assembly 47.

A flip latch assembly 55 is provided which has a latched state and an unlatched state and which is operatively associated with the flipping assembly 49 for preventing rotation thereof when the flip latch assembly 55 is in the latched state.

A translation latch assembly 57 is provided which has a latched state and an unlatched state. The translation latch assembly is operatively associated with the lateral displacement assembly 51 for preventing lateral displacement thereof when the translation latch assembly is in the latched state.

The cartridge handling system 24 has a plunge operating state wherein the stop assembly 53 is in disengaged relationship with the longitudinal displacement assembly 47; the flip latch assembly 55 is in its latched state; and the translation latch assembly 57 is in its latched state. The cartridge handling system 24 comprises a flipping operating state wherein the stop assembly 53 is in engaged relationship with the longitudinal displacement assembly 47; the flip latch assembly 55 is in its unlatched state; and the translation latch assembly 57 is in its latched state. The cartridge handling system 24 also comprises a translation state wherein the translation latch assembly 57 is in its unlatched state.

A first gear assembly 59 is provided which is mounted in rotationally displaceable relationship with the lateral displacement assembly 51 and which is drivingly linked to the longitudinally displacement assembly 47 and the flipping assembly 49.

A continuous drive belt assembly 61 is provided which is continuously nonslippingly engaged with the first gear means 59 for drivingly linking the first gear assembly 59 with the first motor assembly 60. The continuous belt assembly may comprise a first portion 63 extending in a first lateral direction from the first gear assembly 59 and a second portion 65 extending in a second lateral direction from the first gear means. The lateral displacement assembly 51 is laterally displaceable through movement of the continuous belt assembly 61 when the first gear assembly 59 is locked against rotation.

A gear lock assembly 67 having a locked state and an unlocked state is provided which is operatively associated with the first gear assembly 59. The gear lock assembly 67 prevents rotation of the first gear assembly 59 when the gear lock assembly is in its locked state. The cartridge handling system 24 is constructed and arranged such that the gear lock assembly 67 is in its locked state when the translation latch assembly 57 is in its unlatched state, and such that the gear lock assembly 67 is in its unlocked state when the translation latch assembly 57 is in its latched state.

The optical disk cartridge handling system 24 also comprises a vertical displacement assembly 69 for vertically displacing a cartridge 43 engaged by the cartridge engaging assembly 45. A second motor 70 is operatively associated with the vertical displacement assembly 69 for providing driving force thereto.

Figure 3:
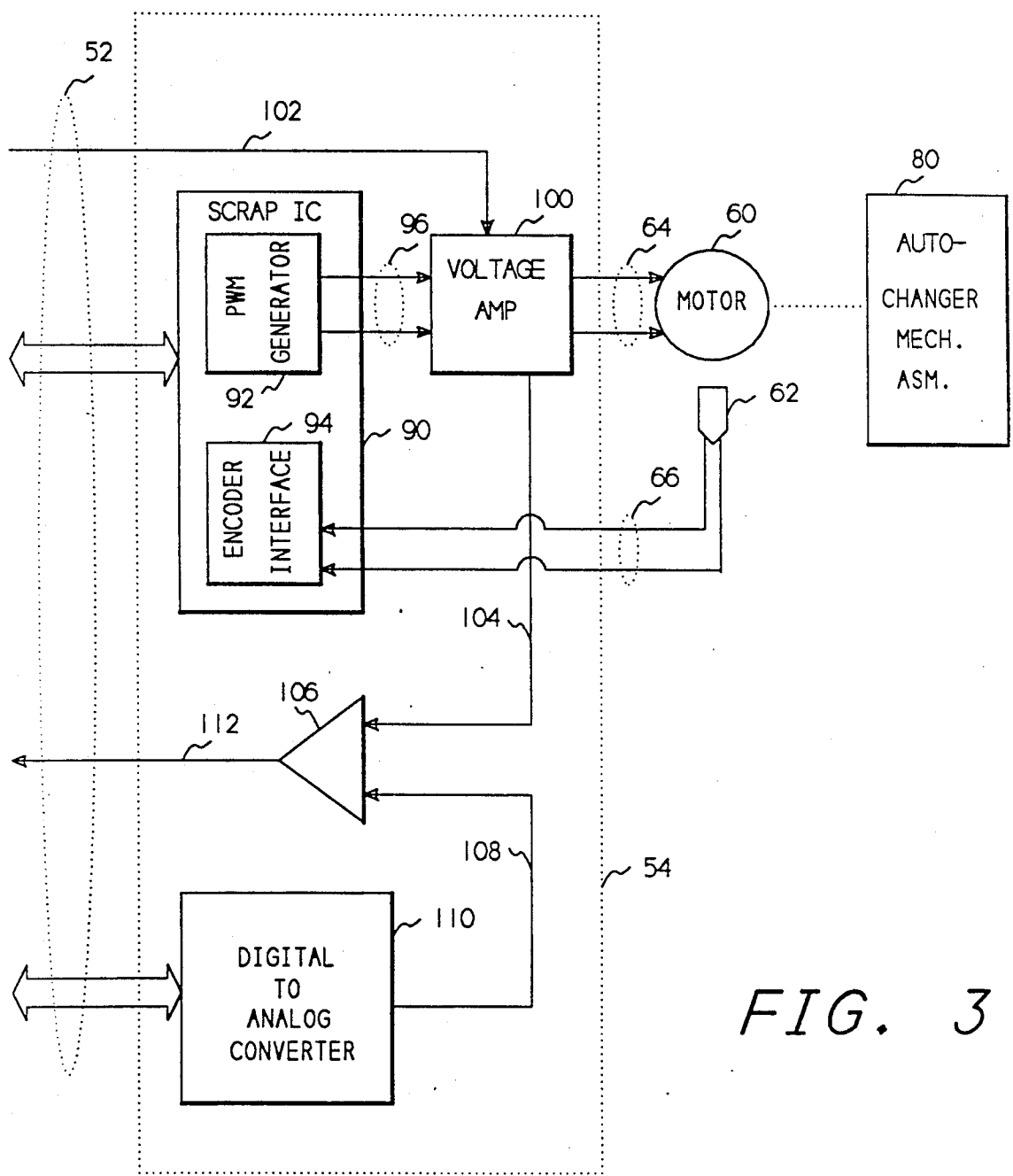
FIG. 3 is a detailed block diagram of the control system interface electronics of the invention.

FIG. 3 depicts a detailed block diagram of the control system electronics, motors, and mechanical assemblies illustrating one of the two control systems of the invention. The method used to drive the motors in the control systems is pulse width modulation ("PWM"), which is commonly used for similar control systems. This method involves controlling motor speed by varying the duty cycle of a constant voltage pulse supplied to the motor, rather than varying the amount of the voltage. Although the PWM method is illustrated, other methods of controlling the motor speed could be used within the scope of the present invention.

Referring now to FIG. 3, the bus 52 transfers data from the microprocessor 50 (FIG. 2) to a pulse width modulation integrated circuit ("IC") 90, which is commercially available as Hewlett Packard part number HCTL-1000. Similar integrated circuits that perform the same functions are available from other manufacturers, such as Motorola part number MC33030, or Silicon General part number SG1731. The IC 90 directly interfaces to the microprocessor bus 52 to allow the microprocessor to write to registers or read from registers within the IC 90 to perform functions necessary to create the PWM output of the IC 90. A PWM generator circuit 92 within the IC 90 accepts a datum from the bus 52 and converts this datum into two, time varying, output signals 96 which are connected to a voltage amplifier 100. Only one of the signals 96 is active at a time, based on the polarity of the datum, and this active signal has a duty cycle which is proportional to the value of the datum—the larger the value, the longer the duty cycle. The signals 96 are amplified by the voltage amplifier 100 to a level suitable for driving the motor 60. The voltage amplifier 100 can be enabled or disabled from the microprocessor by signal 102.

A shaft encoder 62 (also shown in FIG. 2) is a commercially available part that provides a two channel output of the angular position of the motor shaft. Examples of this part are Hewlett Packard part numbers HEDS-5500, HEDS-6000, and HEDS-9000. The shaft encoder 62 is mounted on the shaft of the motor 60 to form 15 a self contained unit. Inside the shaft encoder is an encoder disc (not shown) with a photo transmitter (not shown) on one side of the disc, and a photo receiver (not shown) on the opposite side of the disc. The disc is transparent except for a series of dark lines printed or etched on its surface. Light from the phototransmitter shines through the disc and as the shaft rotates, a pulse train is generated by the dark lines interrupting the light. Two receivers are used, spaced 90 degrees apart, so the two output channels from the receivers can be used to detect the direction of rotation. The pulse train output by the two channels is fed to an encoder interface and counter section 94 of the IC 90. The phase relationship of the two channels determines whether the motor is rotating clockwise or counterclockwise. The IC 90 decodes the phase and counts the number of pulses generated by the shaft encoder 62 and presents this data to the bus 52 for processing by the microprocessor 50. By obtaining the encoder 62 data from the IC 90, the microprocessor determines the speed and direction of rotation of the motor 60. Counters in the encoder interface 94 also maintain motor shaft position.

The control system interface electronics 54 also includes a means of converting the current running through the motor 60 into a signal which the microprocessor can use to determine the amount of such current. The method measures voltage across a sampling resistor (not shown), in series with the motor leads 64, by inputting this voltage 104 into a differential amplifier 106. There it is compared to a known voltage signal output by a digital to analog converter circuit ("DAC") 110. The microprocessor 50 sends data to the DAC 110 which converts the data to an analog signal 108. This signal 108 is compared by the differential amplifier 106 to the voltage signal 104 that represents motor current. The output signal 11 of the differential amplifier 106 is read by the microprocessor 50 to determine if the DAC output 108 is greater than or less than the voltage value 104 for the motor current. In this way, the microprocessor 50 can change the DAC 110 value until the signal 112 changes value, thus determining the motor current.

Figure 4:
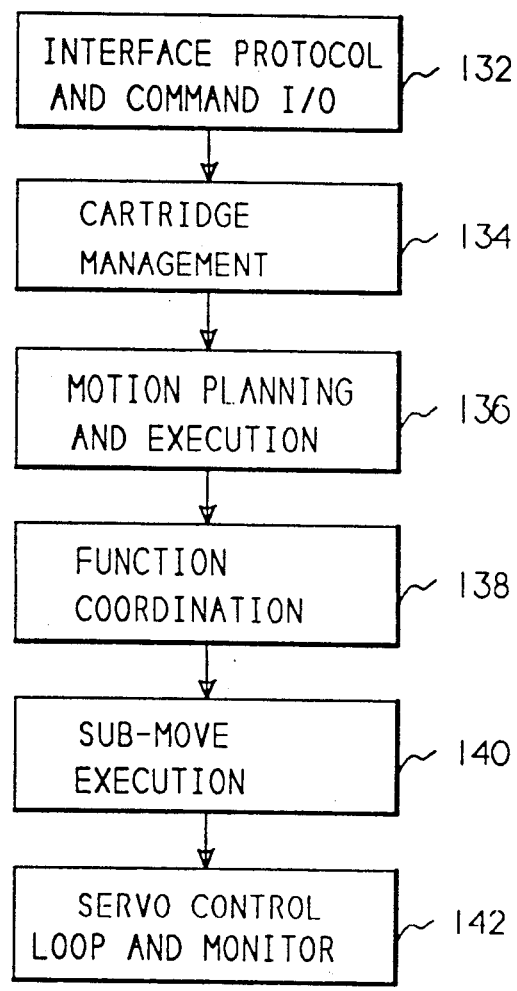
FIG. 4 is a flow diagram of the major modules of the software z of the present invention.

FIG. 4 is a high level block diagram of the function to function flow of the software of the present invention. Block 132, interface protocol and command I/O, interacts with the interface electronics 46 (FIG. 2) to receive commands from the computer system 10 (FIG. 1), and to transmit status back to the computer system 10. Block 132 passes the commands to the cartridge management block 134 which is responsible for keeping the logical arrangement of all locations and their corresponding status. Block 134 also translates interface commands from the computer system into autochanger internal command structures that are passed to the motion planning and execution function, block 136. This function transforms a command structure into a series of autochanger sub-commands that will perform the command. Block 136 also sequences the sub-commands to perform the command in the most time-optimal way. Block 138, function coordination, coordinates the series of sub-commands in order to execute the command by modifying the operation of the control systems to properly move each of the required mechanical assemblies. The sub-move execution block 140 performs the lowest level motion in the autochanger in order to perform each sub-command. It coordinates the input position to each of the control systems and generates a move profile for each input based on given acceleration, peak velocity, and force parameters which were supplied by blocks 136 and 138. The servo control loop and monitor, block 142, interfaces with the control system electronics 54 (FIG. 2) to control the position of the motors in the two control systems through a digital compensation algorithm. This block also maintains position, force and velocity data for the two control systems, and it monitors the systems and disables power to the systems if abnormal or unexpected conditions arise.

Figure 5:
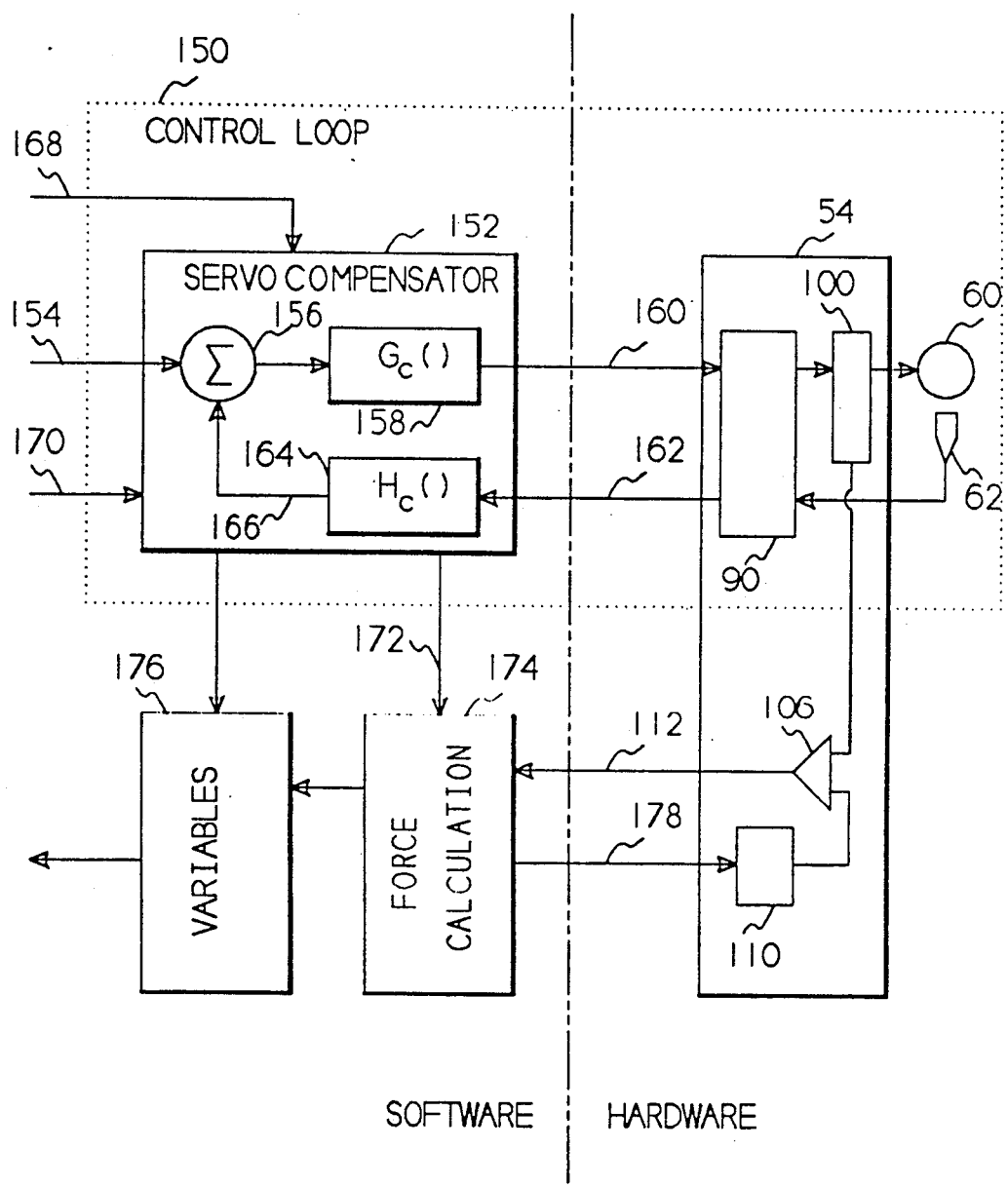
FIG. 5 is a diagram of the servo control system of the present invention.

FIG. 5 shows the servo control system of the present invention. A conventional digital servo control loop 150 is used to control a motor for a control system. The present invention has two such control loops, designated Y control loop, and Z control loop. Each control loop has a servo compensator 152 which inputs a position signal 154 to a summing junction 156. The output of the summing junction 156 is fed to an output transfer function $G_c$ which converts the output of the summing junction 156 to a signal 160 by multiplying the output 156 by a constant $K_p$. $K_p$ is shown in table 1 for each move of each control system. The resulting value is fed to the IC 90 in the control system interface electronics 54. The signal is then amplified by the amplifier 100 and input to the motor 60. A shaft encoder 62 sends information to the IC 90 which feeds position and velocity information through signal 162 to the feedback transfer function $H_c$ 164. The feedback transfer function 164 converts the position and velocity information into a negative feedback signal 166 which is input to the summing junction 156. The function $H_c$ is:

$$H_c = 1 + K_v d/dt$$

where d/dt is the derivative of the input 162 and $k_v$ is a constant value. $K_v$ is shown in table 1 for each move of each control system. Thus $H_c$ adds the output position to the derivative of the output position times a constant $K_v$. The values for $K_p$ and $K_v$ depend upon the accuracy and stability requirements for the systems. Increasing $K_p$ reduces position error. Both $K_p$ and $K_v$ determine the control system's stability and performance. In this manner, the control loop 152 changes the position of the motor 60 whenever a new position is received on line 154. As will be described later, the motor 60 may have different loads at different times. To compensate for these different loads, the different compensator values $K_p$ and $K_v$ may be input to the servo compensator 152 by a compensator values signal 168. Also, in the event software determines that the control system must be stopped, a shutdown signal 170 is input to the servo compensator 152 to cause the shutdown.

The force calculation module 174 determines the amount of force being exerted by the motor. It receives compensator values and motor speed from the compensator 152 through signal 172. The mechanical sense of touch of the present invention is the calculation of forces being exerted by the autochanger's control systems and the ways in which the force information is used during the autochanger's operation. This mechanical sense of touch uses knowledge of the mechanical parameters of the system to derive the amount of force being exerted by the systems' motors onto the mechanics. A periodic calculation of the force is made by the force calculation module 174 and is made available to other software modules within the system by placing the force information into a variables memory area 176. This force information is used by the other software modules as a sensing mechanism for positional feedback and for detection of abnormal situations within the autochanger. Force is directly related to motor torque by the equation $$F = T_m/r$$

where F is the exerted force created by the motor torque, $T_m$, operating at an effective radius r, where r is determined by the gearing used to attach the autochanger mechanics to the motor assembly, and / represents division. Motor torque is directly related to motor current by the equation $$T_m = I_m \cdot K_t$$

where $I_m$ is the instantaneous motor current and $K_t$ is the motor's torque constant, and * represents multiplication.

Motor current can be calculated by direct measurement via electronics, or by calculation from knowledge of motor voltage and motor speed. The resulting equation becomes $$F = T_m/r$$
$$= (K_t/r) * I$$

In the present invention, the direct measurement is accomplished by a combination of electronics and software. As described above with reference to FIG. 3, a voltage proportional to motor current from the amplifier 100 is compared to the output of a DAC 110 by a differential amplifier 106. The force calculation module 174 sends a value to the DAC 110 via signal 178, and receives the comparison of this value to the voltage proportional to the motor current via signal 112. The software 174 changes this value until the signal 112 indicates an equal comparison, then the value represents the motor current. Since $K_t$ and r are constants, a new constant K can be calculated in advance, and the resulting equation is $$F = K * I$$

Motor current can also be calculated by the equation $$I_m = (V_m - (K_t * W))/R$$

where $V_m$ is the motor voltage, $K_t$ is the torque constant of the motor, R is the resistance of the motor and associated driver circuits for the motor, and w is the radian velocity of the motor shaft. Since a digital controller is used in the control loop 150, $V_m$ and w are already available in digital form. A simple calculation of the force is made via the equation:

$$\begin{aligned} F_m &= (K_t/(r*R)) * (V_m - (K_t * w)) \\ &= (K_1 * V_m) - (K_2 * w) \end{aligned}$$

where $K_1 = K_t/(r*R)$ and $K_2 = K_t^2/(r*R)$.

As will be described below, force information is used extensively throughout the controller software as a form of feedback and obstacle detection. The controller can sense the completion of an operation by monitoring the force at strategic times during execution of an operation. The controller can adjust the movements of the motors until a desired force or opposition is obtained. Abnormal situations, which warrant immediate stoppage of all movements, can also be detected by monitoring the force.

After calculation, the force is stored in the variables memory area 176.

Basic Operations

Figure 6:
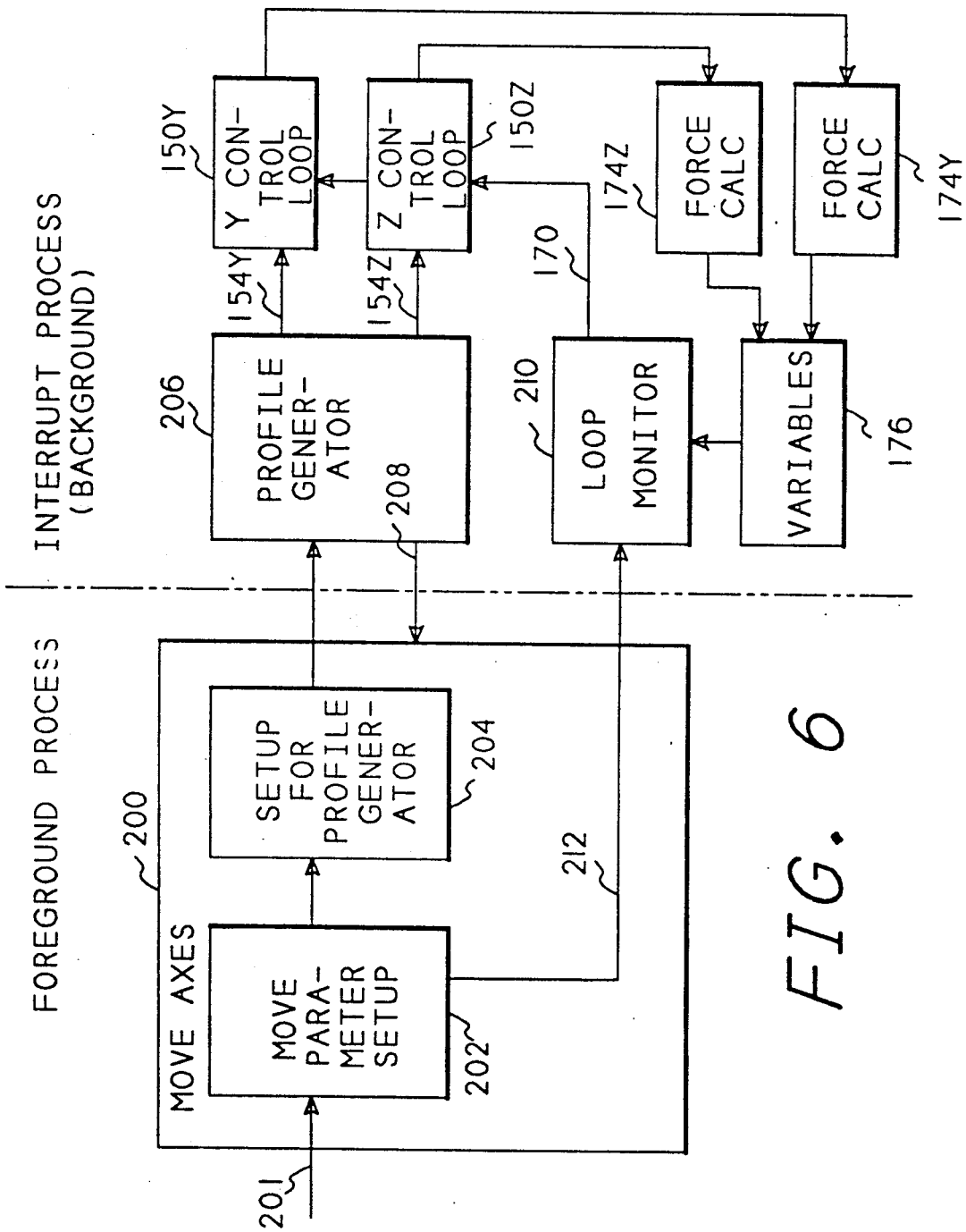
FIG. 6 is a block diagram of the major modules and data flow involved in a move operation.

Referring now to FIG. 6, a block diagram showing the major modules and data flow involved in a move operation is depicted. A move axes module 200, which is one of the sub-move execution modules 140 (FIG. 4), receives input parameters 201 containing delta Y, delta Z, and ID values. Delta Y and delta Z are the number of shaft encoder counts between the current position and the new position. The ID value is used as an index into a lookup table to retrieve the force values that are then passed to loop monitor 210 through signal 212. The table also provides acceleration, in millimeters per second per second, and velocity in millimeters per second, for input to block 204. Table 1 shows the force values, acceleration (Accel) and velocity ($V_p$), for each of the control systems operations. Block 204 converts the acceleration and velocity parameters into data for the profile generator, and provides scaling information for the profile generator. Block 204 then initiates the movement. Once the movement is started, periodic timer interrupts will transfer control to the profile generator 206. Using the parameters passed from block 204, the profile generator 206 dynamically builds a position profile of how the movement should occur. This profile includes Y and Z positions over time, and these positions are passed to the Y control loop 150Y via signal 154Y, and to the Z control loop 150Z via signal 154Z. The control loops were described with reference to FIG. 5. As movement of the mechanisms occurs, the control loops send information to force calculation modules 174Y and 174Z (which were described with reference to FIG. 5), that store force information in the memory variables 176. When the setup was being performed by block 202, shutdown force settings were passed to loop monitor 210 via signal 212. The loop monitor 210, described below, compares the shutdown force settings to the forces in the memory variables 176, and shuts down the control loops 150Y and 150Z if the forces exceed safe limits. When the movement is complete, a done signal 208 is returned to the move axes module 200 which, in turn, notifies its caller that the move is complete. Note that the profile generator, control loops, and loop monitor run as background, interrupt driven modules, so the control system is constantly being serviced.

Figure 7:
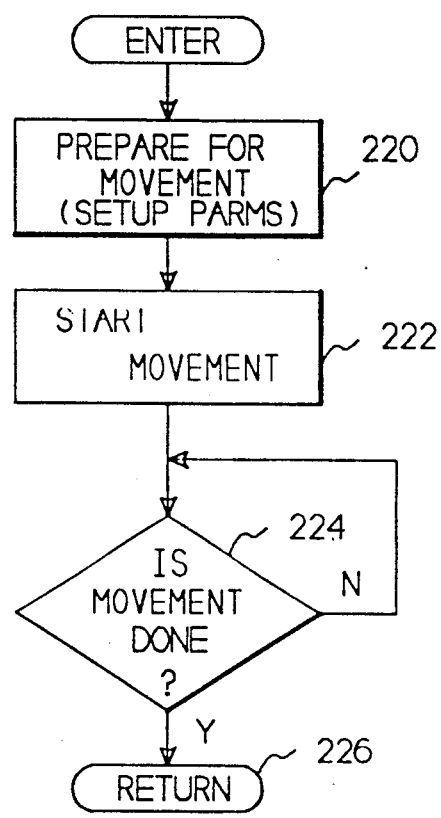
FIG. 7 is a flowchart of a move operation.

FIG. 7 depicts the move axes module process as a control flowchart. After entry, block 220 prepares for movement by setting up the move parameters and the profile generator, block 222 starts the movement, and block 224 just waits on the background processes to complete the move. After completion, control is returned to the caller at block 226.

Figure 8:
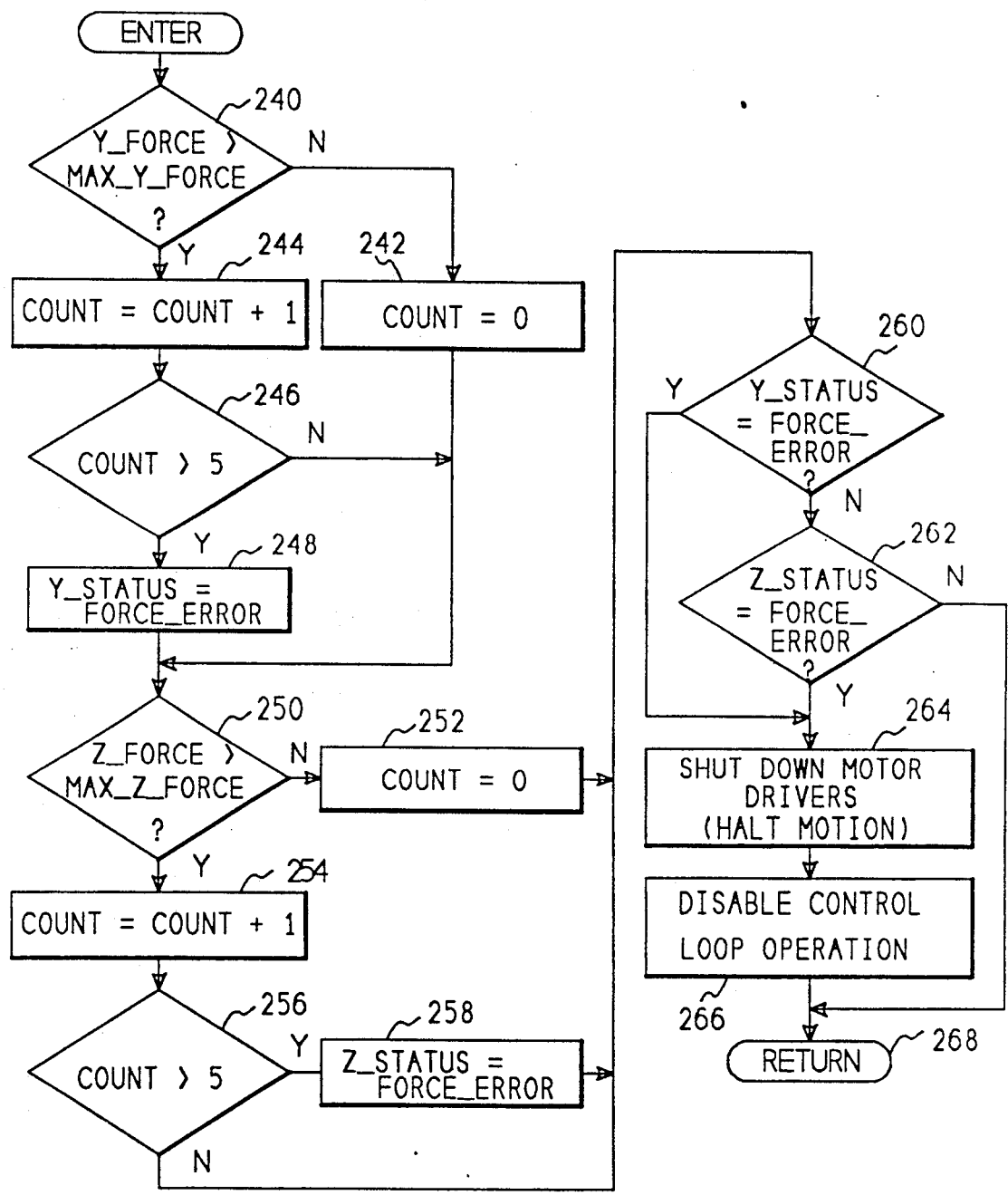
FIG. 8 is a flowchart of the loop monitor that continuously monitors the forces exerted by the control systems.

FIG. 8 is a flowchart of the loop monitor block 210 (FIG. 6). This module receives maximum force parameters from the move parameter setup block 202 and compares these force values with the force being exerted by the motors, each time it receives control. If the force being exerted exceeds the maximum values, the control systems are both shut down. Referring now to FIG. 8, after entry via a timer interrupt, block 240 compares the force being exerted by the Y control system to the maximum Y force passed from the move parameter setup. If the force is less than or equal to maximum Y force, control transfers to block 242 where a count value is set to zero. The count is used to allow the force to exceed the maximum value for a short period of time without causing shutdown, however, if the force exceeds the maximum value for a longer period, a shutdown will occur. To ensure that the high force occurs over a long period of time, the module sets the count value to zero anytime it gets control and the force is below the maximum.

If the force is greater than the maximum, block 244 increments the count, then block 246 evaluates the count. If the count is greater than a value necessary to ensure that the count has been high for the maximum time allowed, control transfers to block 248 where Y__ status is set to force error, which will cause shutdown. In either case, control transfers to block 250 where the Z force is compared to the maximum Z force. If Z force is less than the maximum, block 252 sets the count to zero, otherwise, block 254 increments the count. Block 256 evaluates the count and if it is large enough, control transfers to block 258 to set Z__status to force__error, which will cause a shutdown.

Control then goes to block 260 and block 262 to check for either a Y__status of force__error or a Z__ Status of force__error. If either condition is true, control goes to block 264 to shut down the motor drivers to halt motion, then block 266 disables the control loop so that no new commands go to the motors. If neither block 260 nor block 262 detect an error condition, or after a shutdown, control transfers to block 268 to return from the interrupt.

Figure 9:
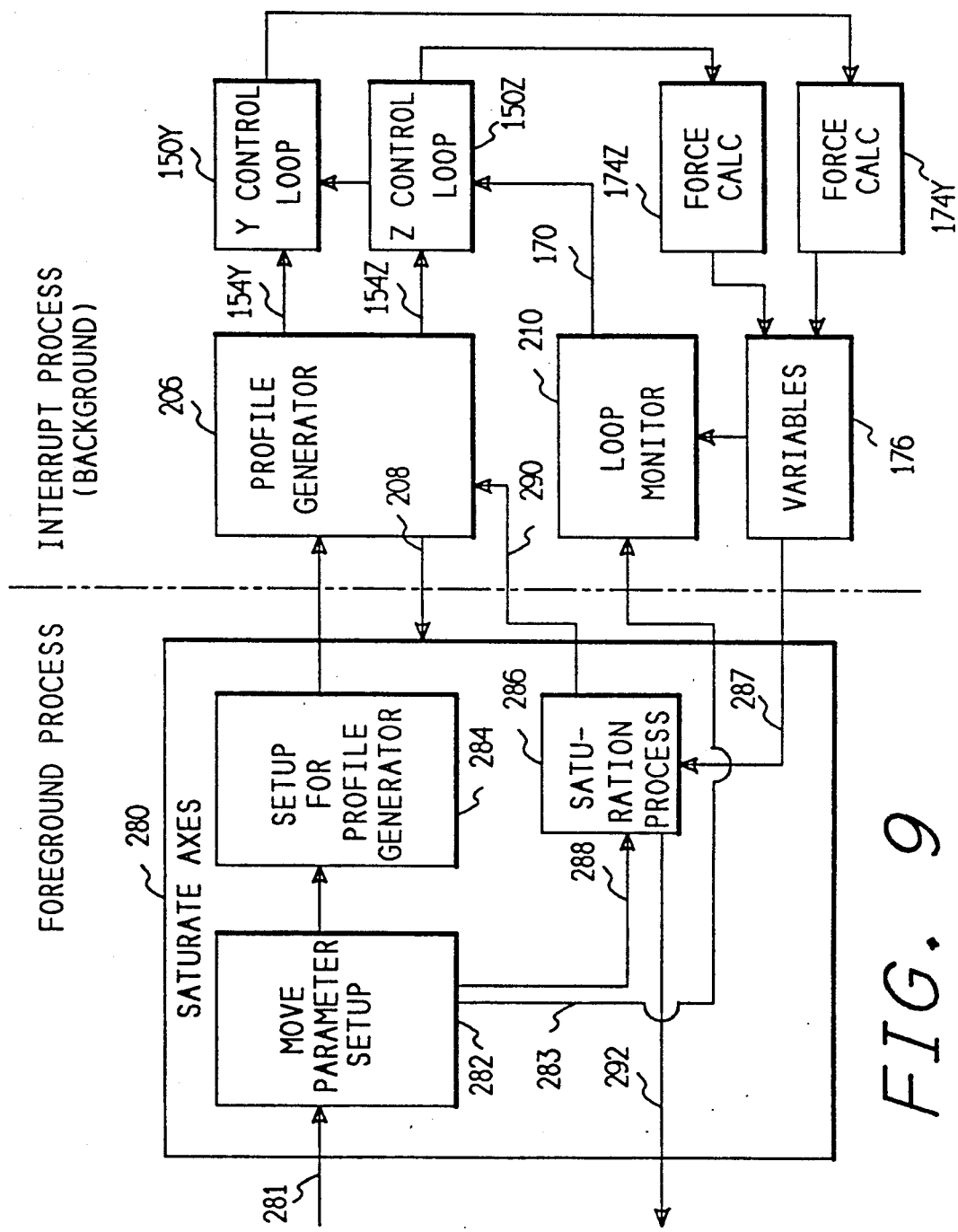
FIG. 9 is a block diagram of the major modules and data flow involved in a saturate operation.

FIG. 9 is a block diagram of a saturate axes operation showing data flow. This operation is like a move operation, except that movement stops either when the destination is reached, or upon detection of a specified force opposing the movement. Referring now to FIG. 9, a saturate axes module 280, which is one of the submove execution modules 140 (FIG. 4), receives input parameters 281 containing delta Y, delta Z, and ID values. Delta Y and delta Z are the number of shaft encoder counts between the current position and the new position. The ID value is used as an index into a lookup table to retrieve the force values that are then passed to loop monitor 210 through signal 283. The table also provides acceleration, in millimeters per second per second, and velocity in millimeters per second, for input to block 284. Block 284 converts the acceleration and velocity parameters into data for the profile generator, and provides scaling information for the profile generator. Block 284 then initiates the movement. Once the movement is started, periodic timer interrupts will transfer control to the profile generator 206, which is the same as the profile generator of FIG. 6. Using the parameters passed from block 284, the profile generator 206 dynamically builds a position profile of how the movement should occur. This profile includes Y and Z positions over time, and these positions are passed to the Y control loop 150Y via signal 154Y, and to the Z control loop 150Z via signal 154Z. The control loops were described with reference to FIG. 5. As movement of the mechanisms occurs, the control loops send information to force calculation modules 174Y and 174Z (which were described with reference to FIG. 5), that store force information in the memory variables 176. When the setup was being performed by block 282, shutdown force settings, which are twice the value of the threshold force settings, were passed to the saturation process 286 via signal 288. Threshold force settings were passed to loop monitor 210 via signal 283. The loop monitor 210, described above, compares the shutdown force settings to the forces in the memory variables 176, and shuts down the control loops 150Y and 150Z if the forces exceed safe limits. When the movement is complete, a done signal 208 is returned to the saturate axes module 200 which, in turn, notifies its caller that the operation is complete. The saturate process 286 also monitors variables 176, via signal 287, to determine when they exceed the threshold values passed from block 282, and when either force exceeds the threshold, movement is stopped through the stop signal 290. At this time saturate status is made available through status signal 292. Note that the profile generator, control loops, and loop monitor run as background, interrupt driven modules, so the control system is constantly being serviced. The saturate process runs in a foreground loop.

Figure 10:
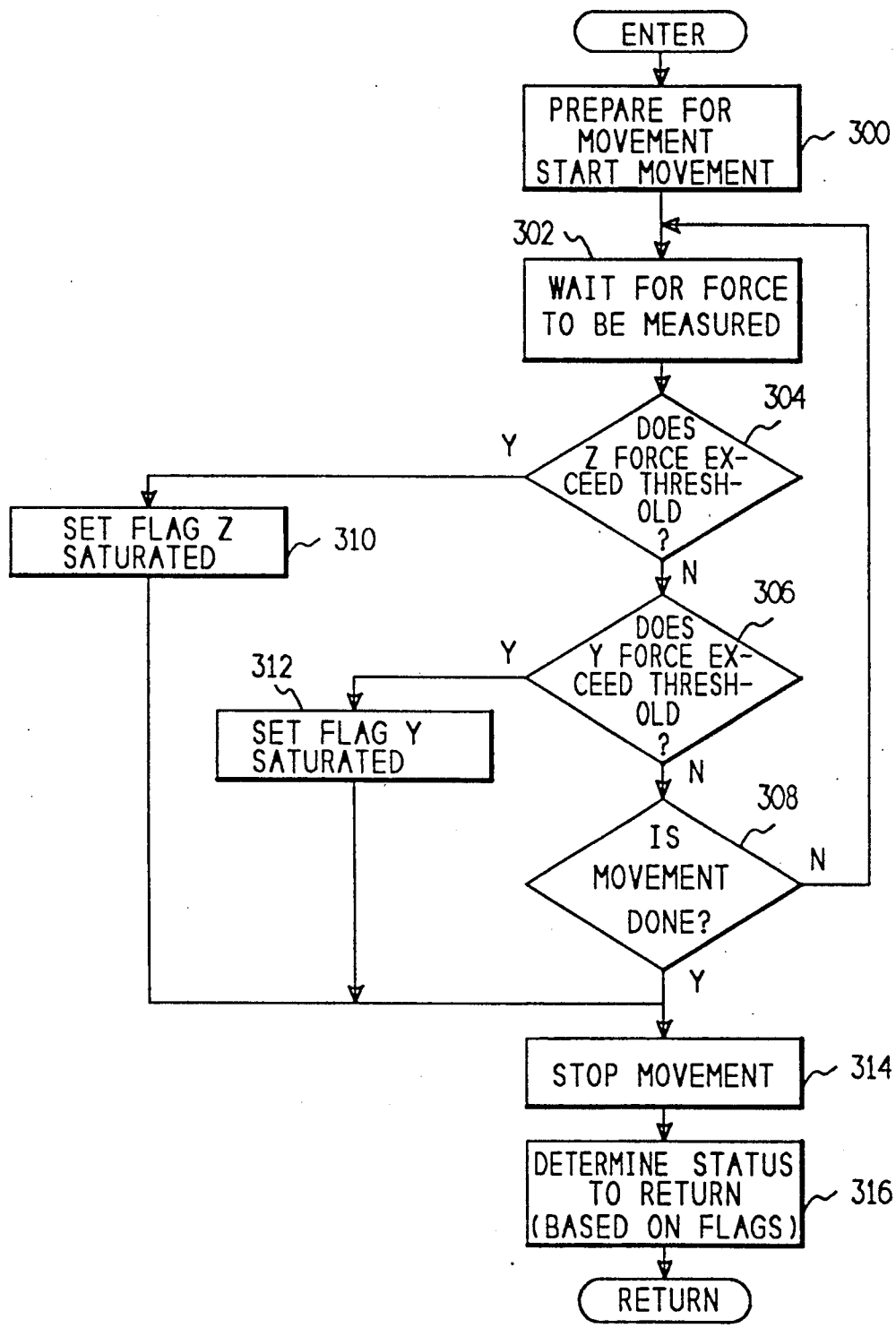
FIG. 10 is a flowchart of the saturate operation.

FIG. 10 is a flowchart of the saturate axes operation. After entry, block 300 prepares for movement by processing the input parameters, delta Y and delta Z, passing shutdown force values to the loop monitor, profile parameters to the profile generator, threshold force values to the saturation process, and then starting the movement. Block 302 waits for a force value to be measured (by the timer interrupt driven force calculation modules), then block 304 determines if the Z force exceeded the Z threshold. If the force did not exceed the threshold, control passes to block 306 to check the Y force value against the Y threshold parameters. If both forces are less then the threshold, control goes to block 308 to determine if the movement is done, that is, has the movement reached the final position. If the movement is not done, control goes back to block 302 to perform the same checks. If the Z force exceeds the threshold, control goes to block 310 to set the Z saturated flag; if the Y force exceeds the threshold, control goes go block 312 to set the Y saturated flag. In either case, or if movement is done, control goes to block 314 to stop movement. Block 316 then determines status to return and returns to the caller.

The move axes and saturate axes routines described above will be used in the following routines that perform specific operations. Each of the following specific move routines are part of the function coordination routines 138 of FIG. 4. In the following descriptions, note that the Y control system moves the engaging, flipping and longitudinally displacing apparatus, also called the transport, vertically, and the Z control system plunges the engaging mechanism inward to retrieve a cartridge, plunges the engaging mechanism outward, flips the transport, and performs the translation movement of the transport. The Z control system also moves the cartridge insertion mechanism of the mailslot. For a more complete description of the mechanical assemblies of the invention, refer to the foregoing patent application (E).

TRANSLATE OPERATION

Figure 11:
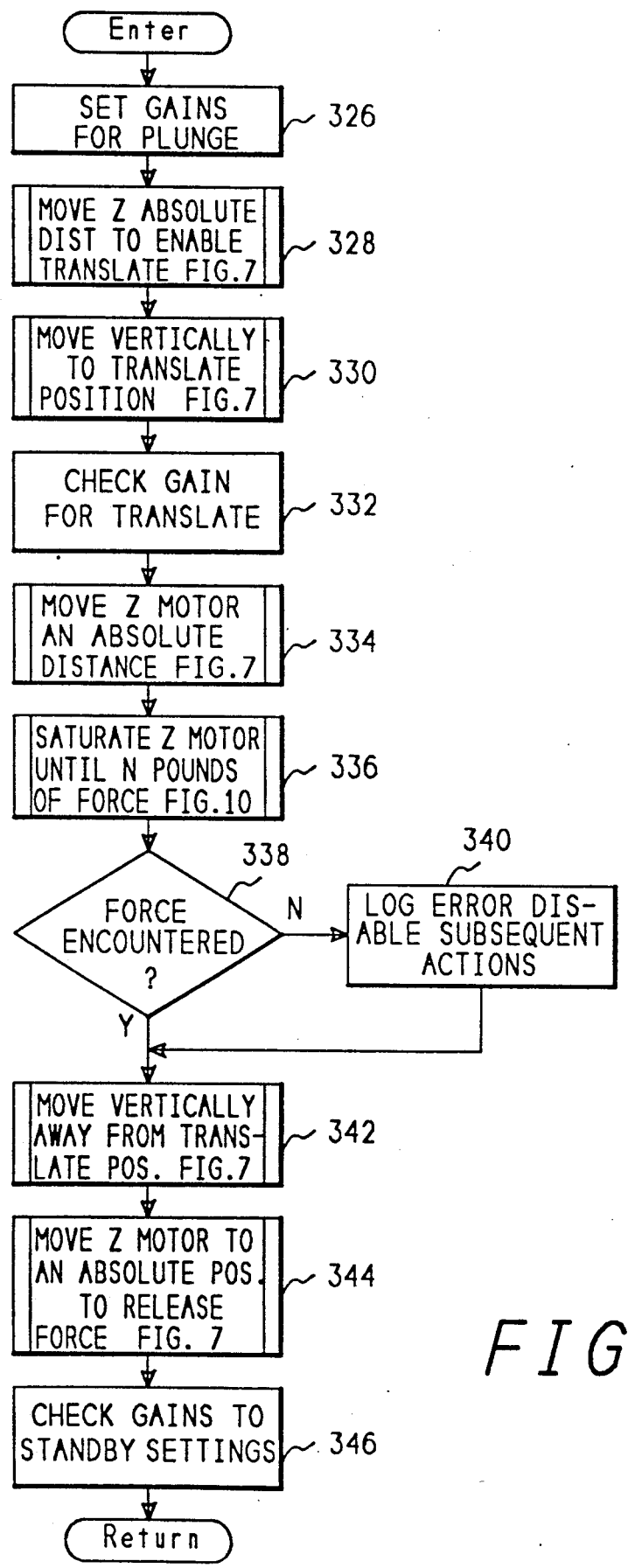
FIG. 11 is a flowchart of a translate operation.

FIG. 11 is a flowchart of a translate operation wherein the transport is moved from one column to the other. This operation involves moving the transport to a position at the bottom of the columns to unlatch the lateral displacement latch. When unlatched, the lateral displacement latch allows the transport to move laterally under control of the Z control system. After the Z control system moves the transport to a new location, the Y control system moves the transport upward to allow the lateral displacement latch to latch, and prevent further lateral displacement.

Referring now to FIG. 11, after entry, block 326 sets the control system gains for a plunge and block 238 moves the engaging mechanism back to a position that will allow the lateral displacement latch to unlatch. Then block 330 calls the move axes module to move the transport to a position at the bottom of the columns which unlatches the lateral displacement latch. Once the lateral displacement latch is unlatched, the transport can be moved laterally, however, this movement presents a new set of plant parameters to the Z control system. That is, a different inertia, and a different friction component are encountered by the Z control system during this movement. Consequently, block 332 changes the gain parameters to the Z control system for this movement. These parameters are shown as signal 168 on FIG. 5. Once the gains have been changed for the translate, block 334 calls move axes to move the transport (by moving the Z motor) to a position near the desired new position at the other column. Block 336 then calls saturate axes to move the transport until N pounds of force are encountered (see table 1 for a definition of N and distance). This operation completes the movement by moving the transport against a mechanical stop. This stop adjusts for manufacturing tolerances in the mechanical location of the new position. After return from the call to saturate, block 338 determines if the force was encountered, and if the force was not encountered, block 340 logs an error in order to disable subsequent functions. In either case, block 342 moves the Y control system vertically away from the translate position, which allows the lateral displacement latch to re-latch, and block 344 moves the Z control system to a new absolute position to remove tension from the system. Block 346 then resets the control system gains for subsequent plunge operations before control is returned to the caller.

REMOVING, INSERTING A CARTRIDGE

FIGS. 12, 13, 14, and 15 illustrate the operations of removing a cartridge from cell, inserting a cartridge into a cell or optical drive, and testing to ensure that the cartridge is completely inserted into the cell.

Figure 12:
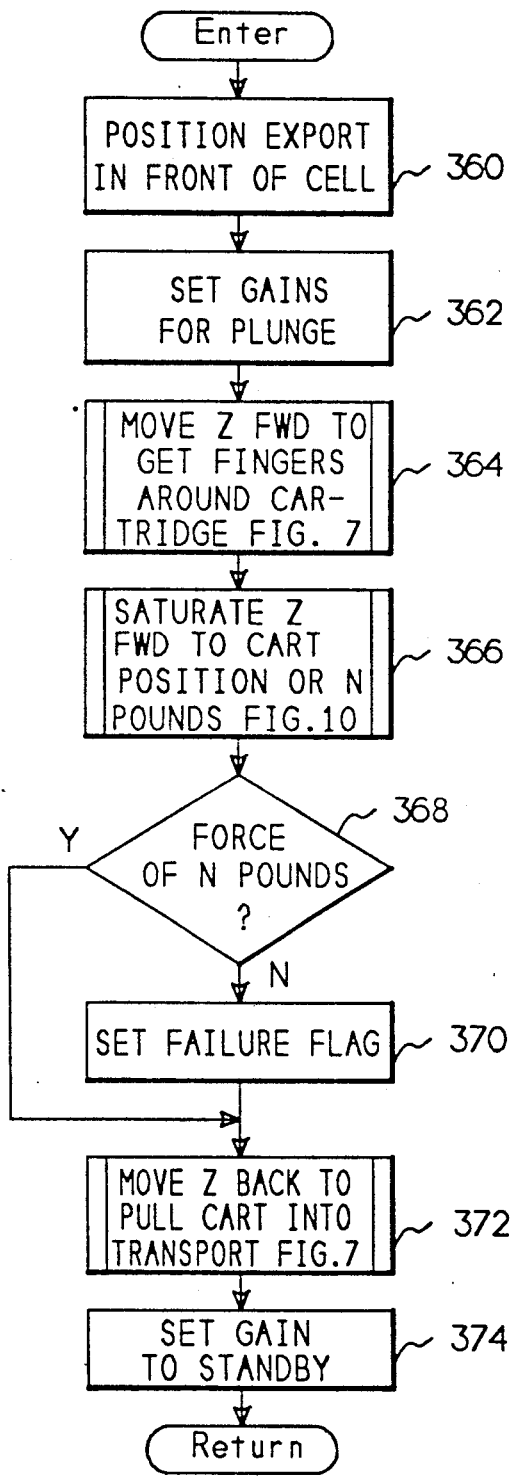
FIG. 12 is a flowchart of removing a cartridge from a cell.

Referring now to FIG. 12, a flowchart of the operation of removing a cartridge from a cell is depicted. After entry, block 360 positions the transport in front of the desired cell. Block 362 then sets the control system gains for a plunge operation. Block 364 calls move axes to move the engaging mechanism forward to a point that the fingers of the engaging mechanism are around the cartridge. Block 366 then calls saturate axes to move the engaging mechanism forward until a force of N pounds is encountered, indicating that the cartridge has been engaged (see table 1 for a definition of N and distance). If the correct force is not encountered, block 368 transfers to block 370 to indicate a failure condition (no cartridge present), otherwise block 368 transfers to block 372 which calls move axes to move the engaging mechanism back to pull the cartridge into the transport. Then block 374 sets the control systems back to the standby gains before returning to the caller.

Figure 13:
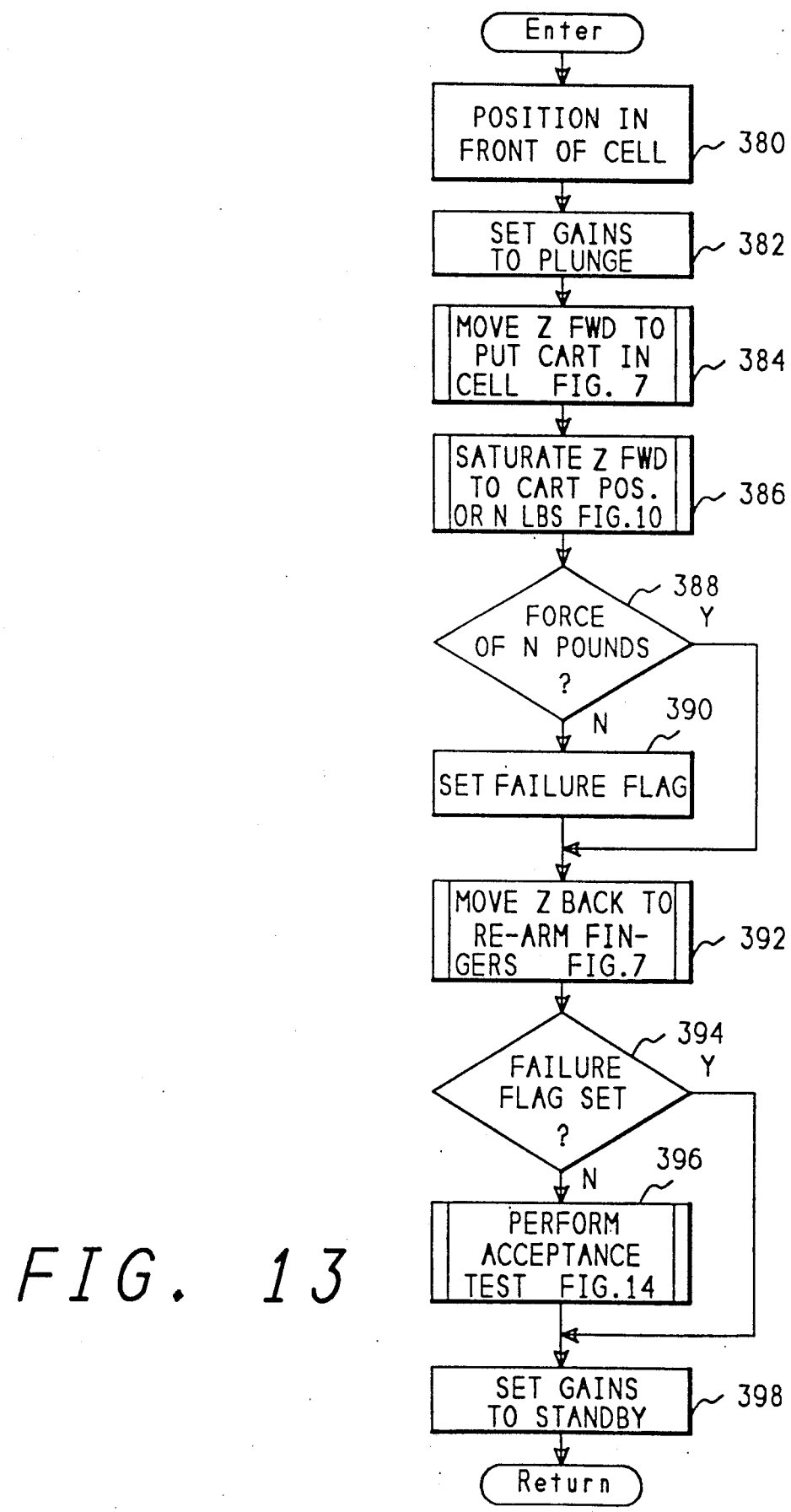
FIG. 13 is a flowchart of inserting a cartridge into a cell.

Referring now to FIG. 13, a flowchart of inserting a cartridge into a cell is depicted. After entry, Block 380 positions the transport in front of the desired cell. Block 382 sets the control system gains for plunging, and block 384 calls move axes to move the engaging mechanism to a position where the cartridge is almost completely in the cell. Then block 386 calls saturate axes to move the cartridge until N pounds of force are encountered, which releases the fingers from around the cartridge (see table 1 for N and distance). If the correct force is not encountered, block 388 transfers to block 390 to indicate a failure, which probably means the transport did not originally contain media. If the correct force was encountered, or after indicating failure, control goes to block 392 which calls move axes to move the engaging mechanism back to re-arm the finger mechanism. Block 394 then tests for an earlier failure, and if no failure occurred, control goes to block 396 which calls the acceptance test (FIG. 14, described below) to determine if the cartridge is completely in the cell. After completion of the acceptance test, block 398 returns the control system gains to standby before returning to the caller.

Figure 14:
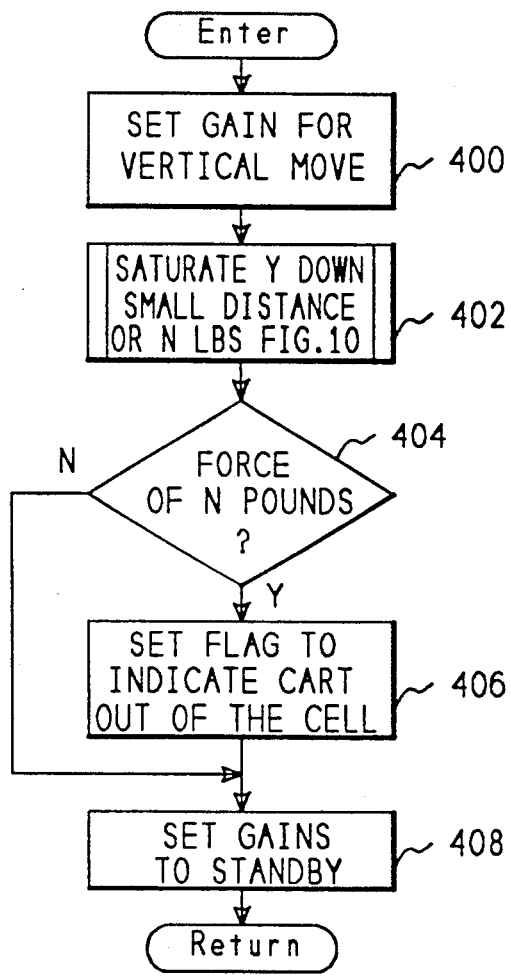
FIG. 14 is a flowchart of an acceptance test to determine if a cartridge is not extending from a cell.

FIG. 14 shows a flowchart of the acceptance test, which tests to determine if a cartridge is completely in a cell. This operation is performed by making a small vertical move and determining if an opposition to the move is encountered. If the move encounters opposition, the cartridge must be out of the cell enough to block transport motion. Referring now to FIG. 14, after entry, block 400 sets the Y control system gains for a vertical move. Block 402 then calls saturate axes to move vertically until N pound of force are encountered, or until a small distance has been moved (see table 1 for N and the distance). Block 404 tests to see if the move encountered the force, and if so, block 406 sets a flag to indicate that the cartridge is partially out of the cell. If the force was not encountered, that is, the vertical move was made, or after setting the flag, control goes to block 408 to set the control system gains back to standby and return to the caller.

Figure 15:
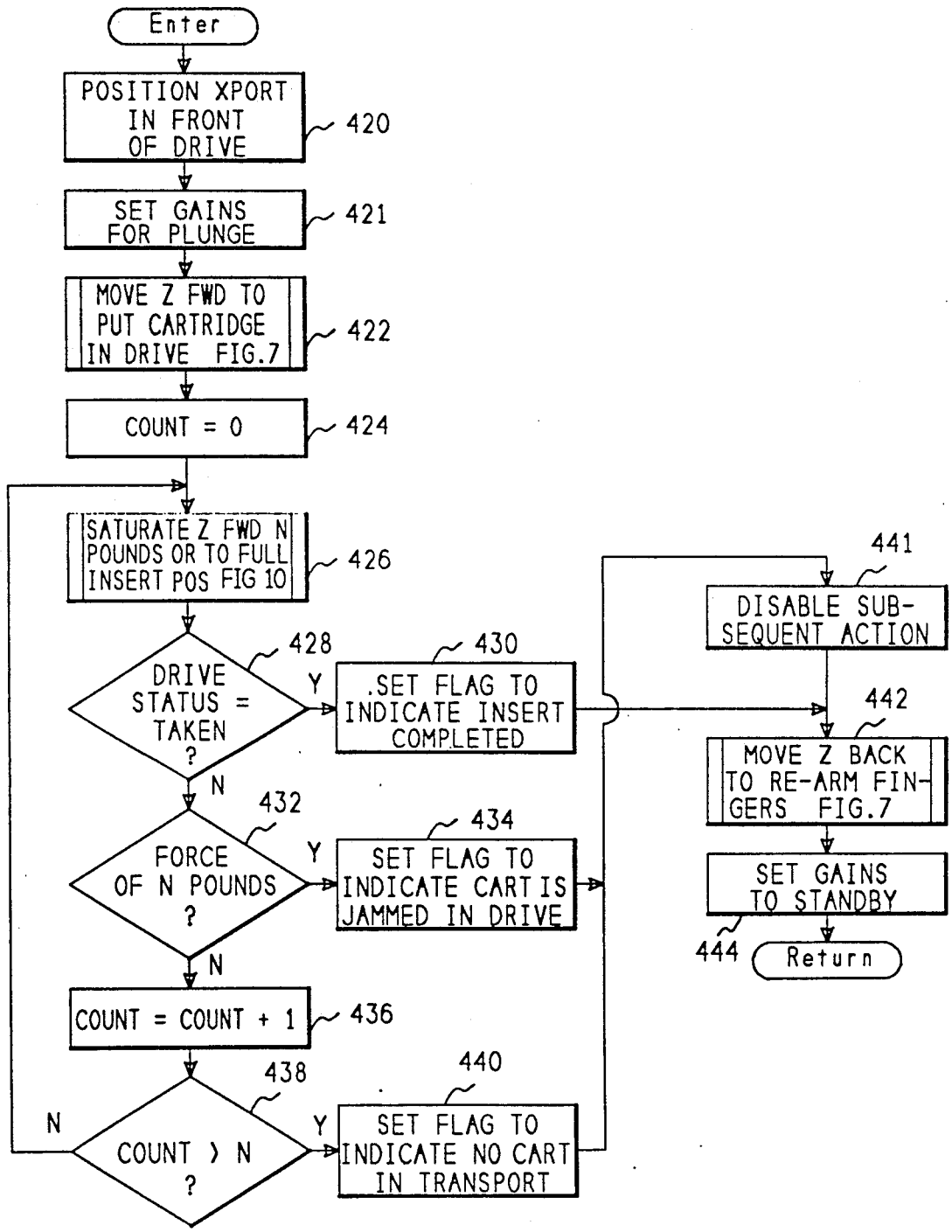
FIG. 15 is a flowchart of inserting a cartridge into the optical drive.

FIG. 15 is a flowchart of the process for inserting a cartridge into the optical drive. This operation is similar to inserting a cartridge in a cell except that a drive signal, indicating that the drive has accepted the cartridge, must be detected before the operation is complete. After entry, block 420 positions the transport in front of the optical drive. Block 421 sets the control system gains for a plunge operation, and block 422 then moves the engaging mechanism forward to a position such that the media is very close to the insertion point. Block 424 sets a count, which will be used to time the operation, to zero. Block 426 calls saturate axes to move the engaging mechanism until either a desired force or position is encountered. Block 428 checks the optical drive interface to determine if the optical drive has taken the cartridge. If the cartridge has not been taken, control goes to block 432 to determine if the threshold force has been encountered. If the threshold force has not been encountered, control goes to block 436 where the counter is incremented, and then block 438 checks the count. If the count is below a predetermined value (5), control transfers to block 426 to continue the operation. If the count exceeds the predetermined value, control goes to block 440 to indicate that no media was present in the transport. If the threshold force is encountered, block 432 transfers to block 434 to indicate that the cartridge has jammed in the optical drive. If either a cartridge is jammed, or there is no cartridge in the transport, block 441 disables any subsequent control system operations. Once the optical drive takes the cartridge, block 428 transfers to block 430 to indicate that the cartridge is in the optical drive. If the drive takes the media, or if the required force is encountered, or if a timeout occurs, control transfers to block 442 to call move axes to move the engaging mechanism back to re-arm the fingers. Then control goes to block 444 to set the control system gains to standby and return status.

FLIP OPERATION

Figure 16:
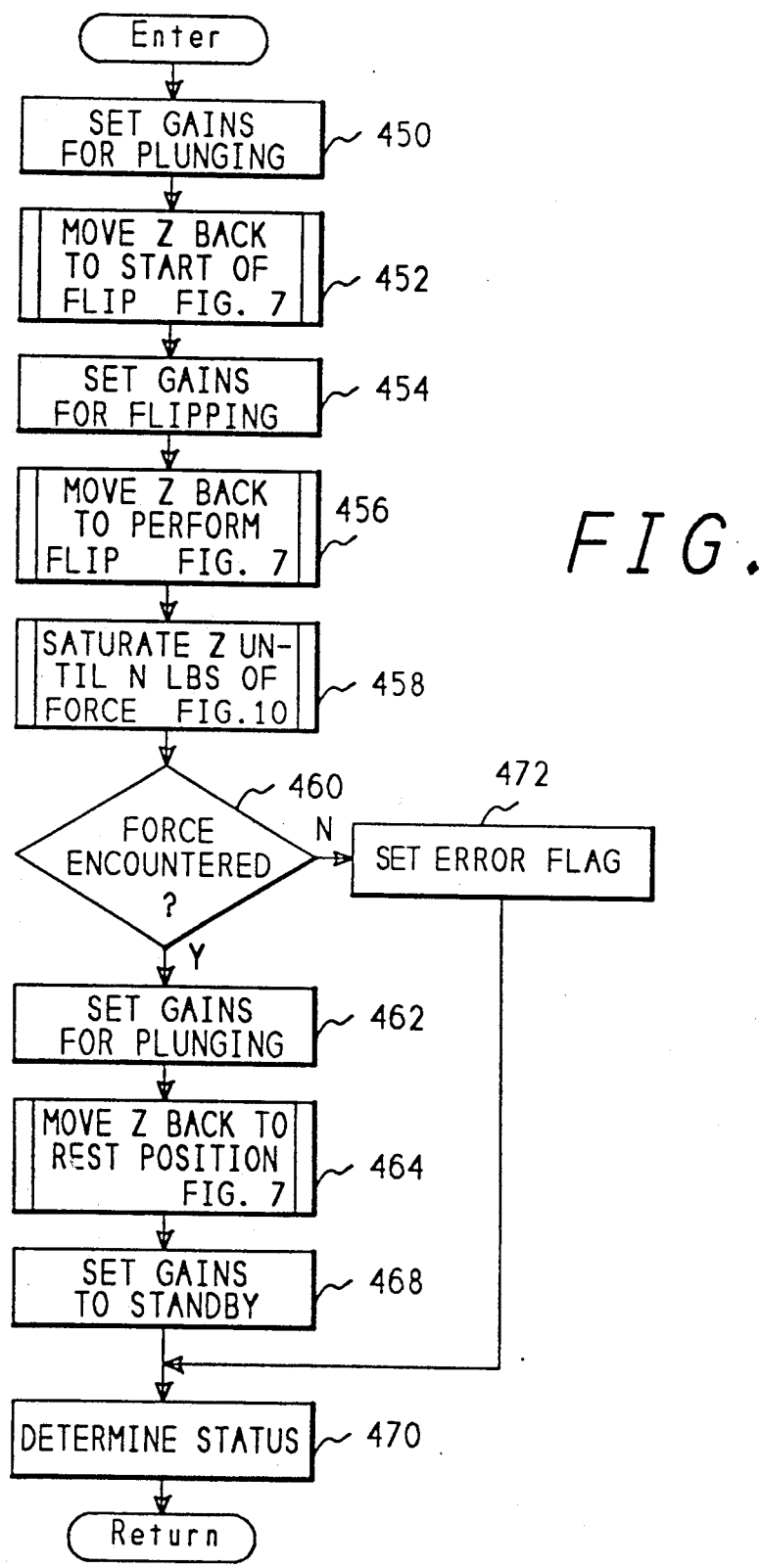
FIG. 16 is a flowchart of the flip operation.

FIG. 16 is a flowchart of a flip operation, which rotates the transport 180 degrees about its horizontal axis in order to place the media in a position that will allow the optical drive to read or write on the opposite side of the media. Referring now to FIG. 16, after entry, block 450 sets the control system gains for a plunge operation, and block 452 moves the engaging mechanism back beyond the rest position to engage the flip latch. Once the flip latch is engaged, the Z control system will encounter a different inertia and friction from that encountered during a plunge. Therefore, block 454 sets the Z control system gains to allow for this new inertia and friction. Block 456 then calls move axes to move the engaging mechanism back to flip the transport almost completely over. Then block 458 calls saturate axes to complete the flip by moving the engaging mechanism until a force of N pounds is encountered (see table 1 for N and distance). Block 460 checks the return status from saturate axes to determine if the force was found, and if not, control goes to block 472 to set an error flag before block 470 gets status and returns to the caller. If the force was found, then the flip was completed successfully, so block 460 transfers to block 462 to set the control system gains for a plunge operation. Block 464 then calls move axes to move the engaging mechanism back to the rest position, and block 468 sets the systems gains back to standby. Control goes to block 470 to determine status before returning to the caller.

TESTING FOR CARTRIDGE PRESENT

Figure 17:
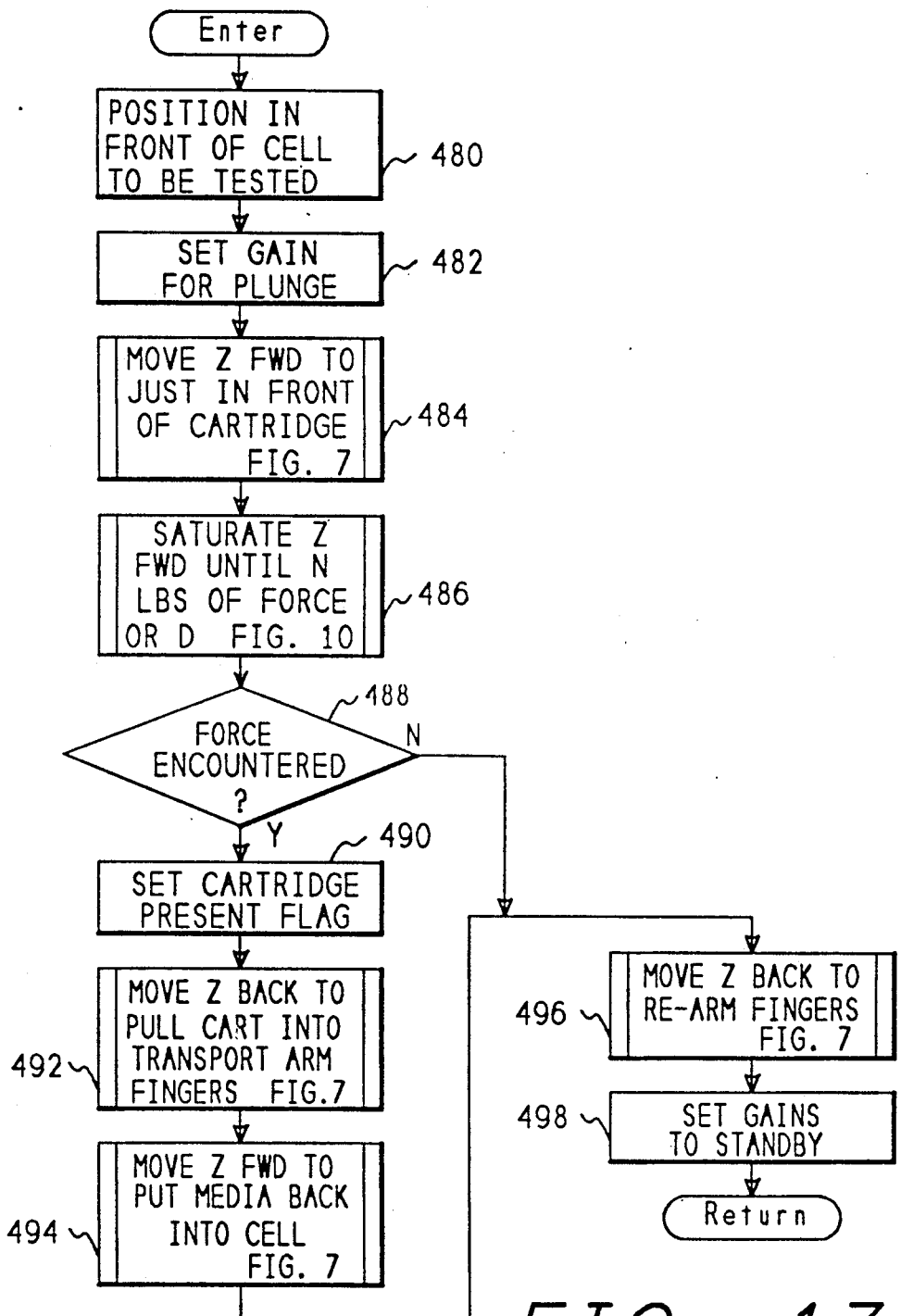
FIG. 17 is a flowchart of the process of testing for a cartridge in a cell.

FIG. 17 is a flowchart of the process of testing for media in a cell. After entry, block 480 positions the transport in front of the cell. Block 482 then sets the control system gains for a plunge operation. Block 484 calls move axes to move the engaging mechanism to a point just in front of the cartridge, then block 486 calls saturate axes to move the engaging mechanism until N pounds of force are encountered, or until the engaging mechanism has moved far enough into the cell for a cartridge to have been encountered (see table 1 for N and distance) Block 488 tests the return status from saturate axes and if the force was encountered, control goes to block 490 to set a flag indicating a cartridge is present in the cell. Block 492 then calls move axes to move the engaging mechanism out to pull the cartridge into the transport, thus arming the fingers. Block 494 then calls move axes to put the cartridge back into the cell. If no cartridge was found, or after the cartridge has been replaced in the cell, block 496 moves the engaging mechanism back to the rest position to re-arm the fingers. Block 498 then sets the control systems gains to standby before control returns to the caller.

Figure 18:
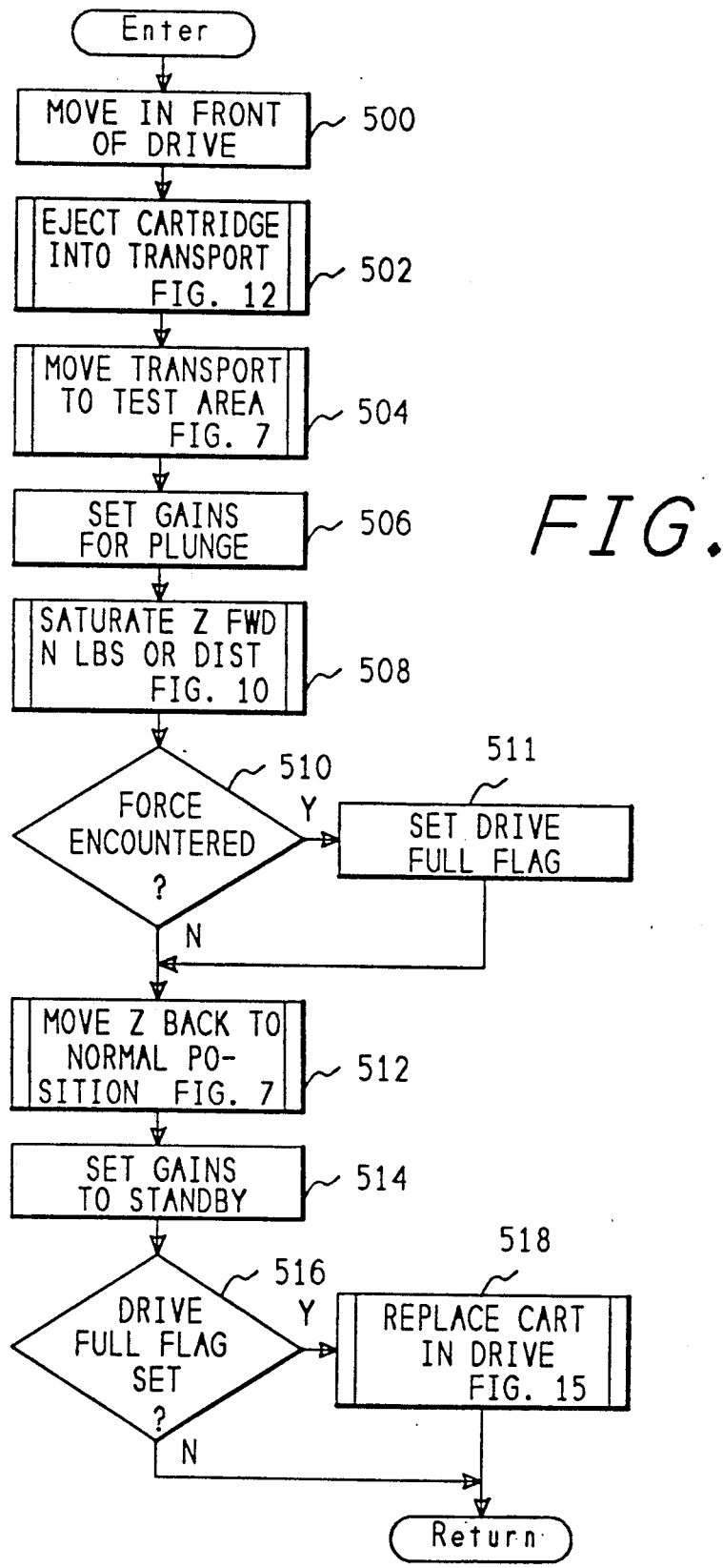
FIG. 18 is a flowchart of testing for a cartridge in the optical drive.

FIG. 18 is a flowchart for testing the optical drive for a cartridge. After entry, block 500 positions the transport in front of the optical drive. Block 502 then calls the grab module (FIG. 12) to eject the cartridge into the transport, if a cartridge is present. Block 504 calls move axes to move the transport to a test area, which does not allow cartridge insertion. Block 506 sets the control system for a plunge operation, and block 508 calls saturate axes to move the engaging mechanism forward until a force of N pounds is encountered (see table 1 for N and distance) or a target position is reached. If the correct force is found, block 510 transfers to block 511 to set a flag indicating that the drive was full. After indicating that the drive was full, or if the correct force was not encountered, control goes to block 512 where move axes is called to move the engaging mechanism back to pull the cartridge into the transport. Block 514 then sets the control system gains to standby. Block 516 tests the drive full flag. If the drive was full, and a cartridge is in the transport, control goes to block 518 to replace the cartridge in the drive before returning to the caller, otherwise control returns directly to the caller.

Figure 19:
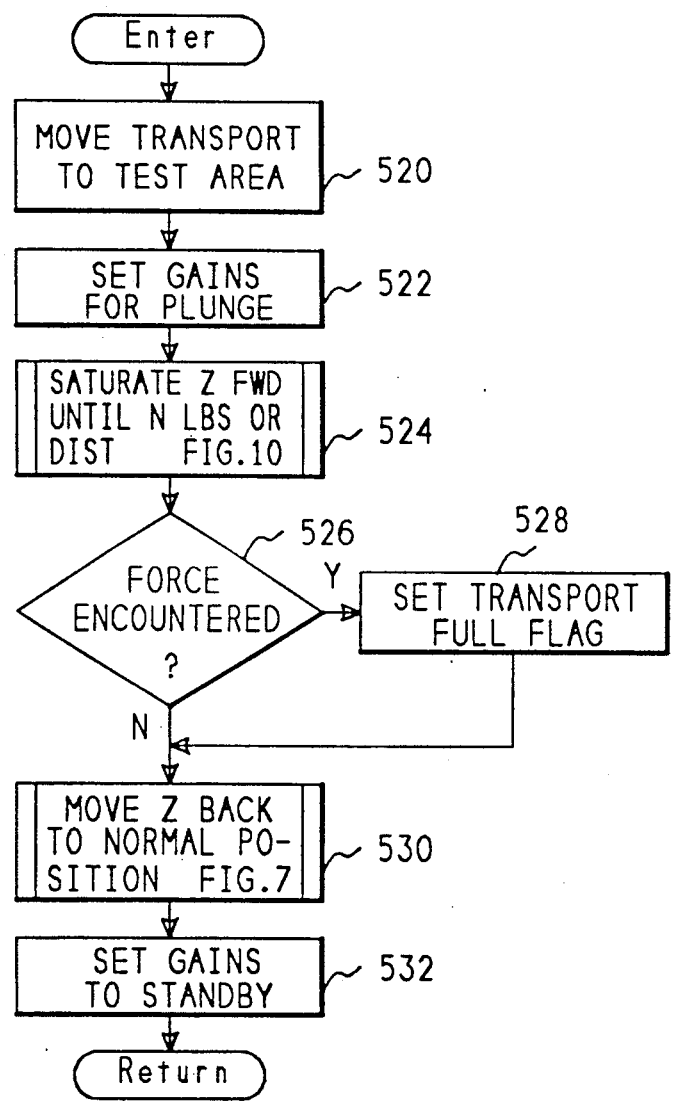
FIG. 19 is a flowchart of testing for a cartridge in the transport.

FIG. 19 is a flowchart of a process to test the transport to determine if a cartridge is present. After entry, block 520 moves the transport to the test area. Block 522 sets the control system gains for a plunge operation, and block 524 calls saturate axes to move the engaging mechanism to a target position, or until a force of N pounds is encountered (see table 1 for N and distance). If the correct force is encountered, block 526 transfers to block 528 to set a flag indicating that the transport is full. After indicating that the transport is full, or the correct force was not encountered, control transfers to block 530 where move axes is called to move the engaging mechanism back to the rest position. Then block 532 sets the control system gains to standby, and control returns to the caller.

MAILSLOT OPERATIONS

Figure 20:
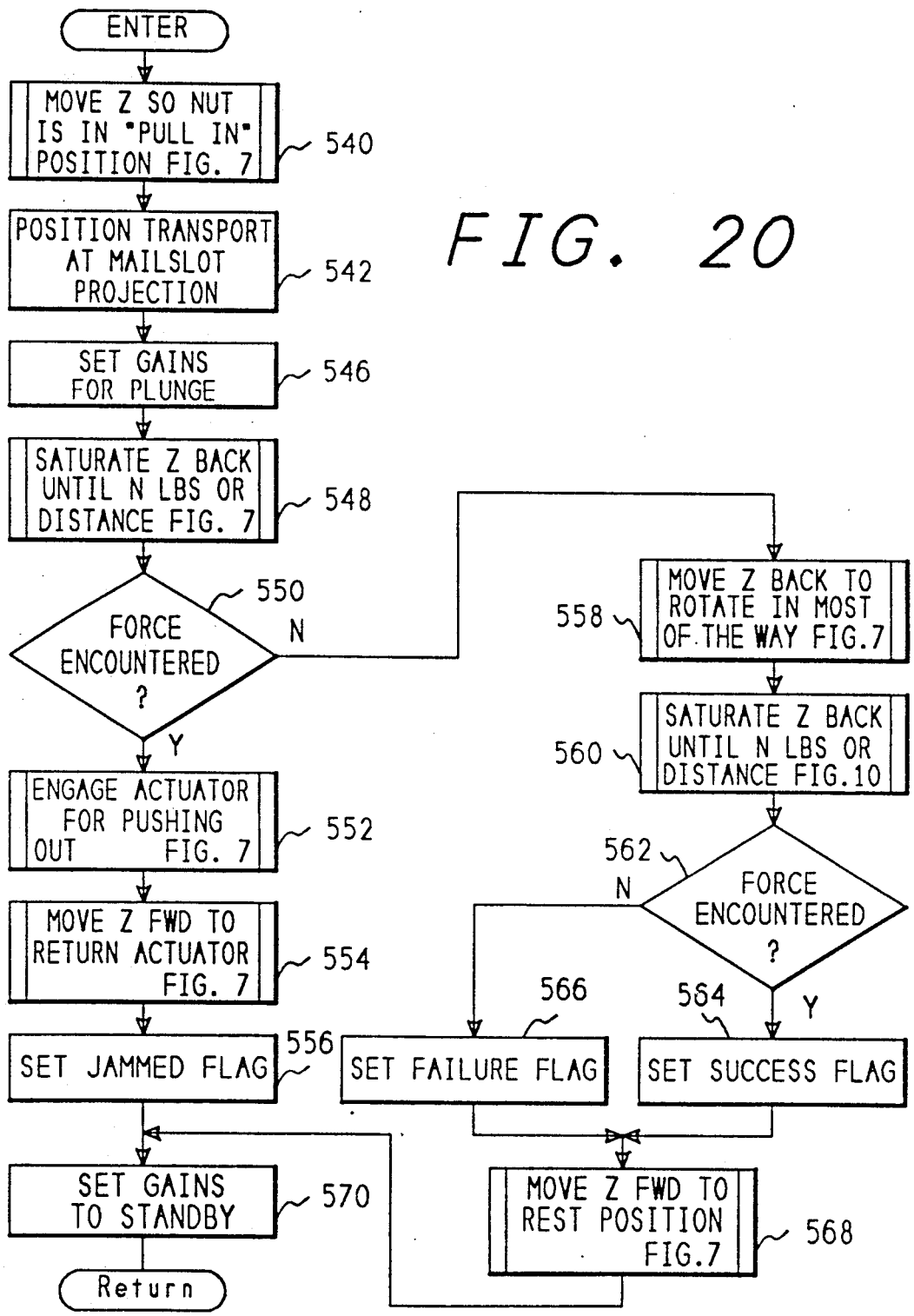
FIG. 20 is a flowchart of the operation of rotating the mailslot inward.

FIG. 20 is a flowchart of the operation of rotating the mailslot in to a position that allows the transport to retrieve a cartridge from the mailslot. As described earlier, the mailslot is designed to allow a human operator to insert a cartridge conveniently. Because of the orientation of the cells, operator convenience requires that the cartridge be inserted into the mailslot in a position that is rotated 180 degrees about the vertical axis from the position of a cartridge in a cell. Therefore, the control systems must rotate the insertion mechanism of the mailslot 180 degrees before retrieving the inserted cartridge, and when ejecting a cartridge, the insertion mechanism must also be rotated 180 degrees before the cartridge can be removed by the operator. This rotation is done by aligning a nut on the engaging mechanism with a projection on the insertion mechanism, then moving the engaging mechanism in or out to cause the desired rotation. The nut is aligned on one side of the projection for rotation inward, and on the other side of the projection for rotation outward.

Referring now to FIG. 20, after entry, block 540 moves the transport into a position that aligns a nut on the engaging mechanism to a position that will allow further alignment of the nut on the side of the insertion mechanism projection that allows for rotation backward. Block 542 completes the alignment by moving the transport mechanism into alignment with the mailslot insertion mechanism projection. Block 546 sets the control system gains for a plunge operation. Block 548 calls saturate axes to move the engaging mechanism backward, thus rotating the insertion mechanism inward. Block 550 checks the force encountered during the movement. If the force exceeded N pounds (see table 1, ROTATE IN JAM for N and distance), then too much opposition was encountered, and the mailslot is probably jammed, so control transfers to block 552 which calls move axes to realign the nut with the outside of the projection. Block 554 then calls move axes to move the insertion mechanism back to its original position before block 556 sets a flag to indicate that the mailslot is jammed.

If block 550 found that the insertion mechanism and the engaging mechanism successfully moved to the position requested, control transfers to block 558 which calls move axes to rotate the insertion mechanism most of the way backward. Then block 560 calls saturate axes to complete the rotation by moving until a force of N pounds is encountered (see table 1, ROTATE IN/OUT COMPLETED for N and distance). Block 562 checks the status from the saturate axes operation and if the force was encountered, control goes to block 564 to set the success flag. If the force was not encountered, control goes to block 566 to indicate that the rotate was not successful. In either case control goes to block 568 to call move axes to move the engaging mechanism to disengage the nut from the projection on the insertion mechanism. Block 570 then sets the control system gains to standby before returning control to the caller.

Figure 21:
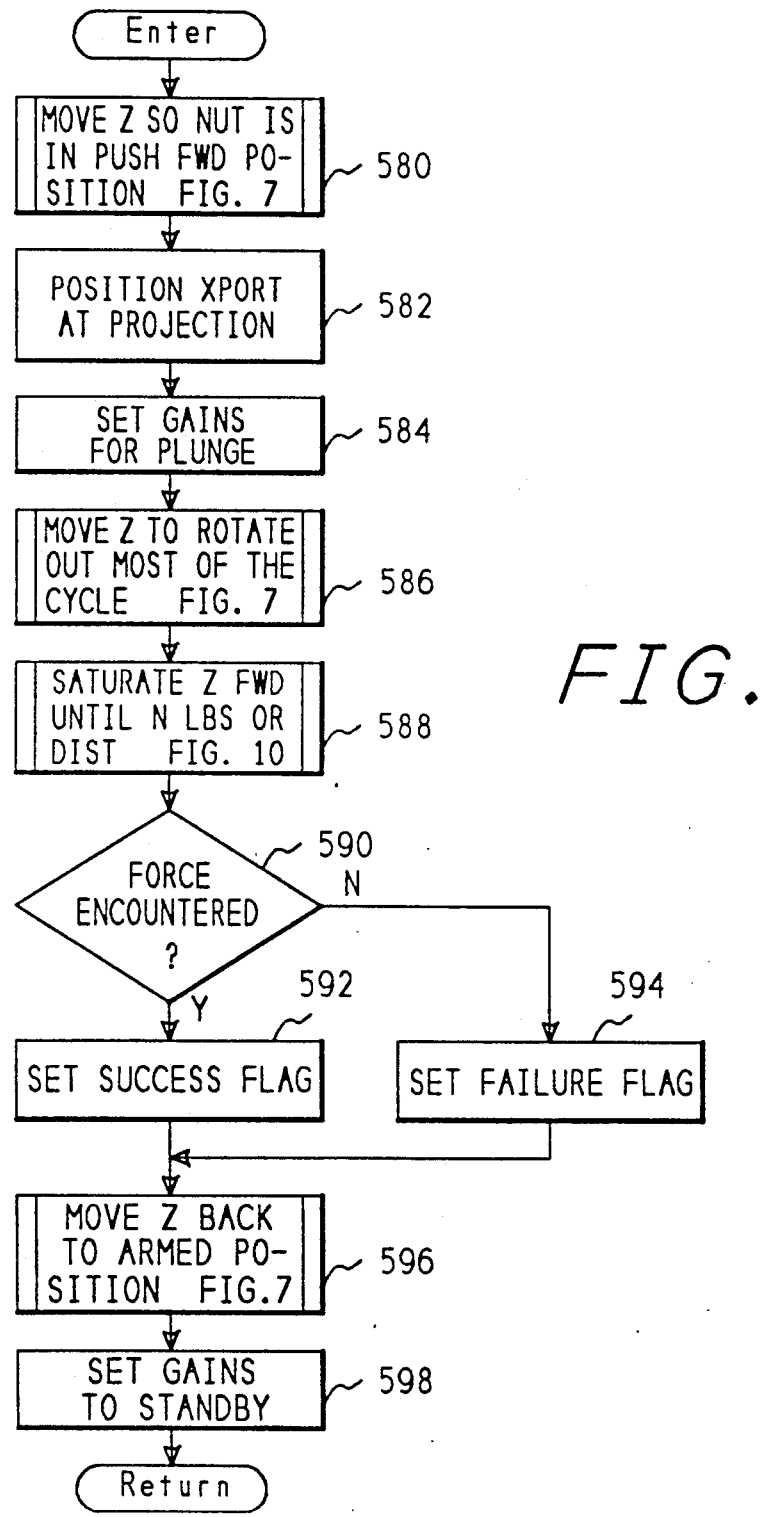
FIG. 21 is a flowchart of rotating the mailslot outward.

FIG. 21 is a flowchart of the rotate out operation, where a cartridge is presented to the operator for removal. Referring now to FIG. 21, after entry, block 580 calls move axes to move the nut into a position that will allow alignment with the insertion mechanism projection on the side for rotating forward. Block 582 then moves the transport into alignment with the projection, then block 584 sets the control system gains for a plunge operation. Block 586 calls move axes to move the engaging mechanism to rotate the insertion mechanism through most of the cycle. Then block 588 calls saturate axes to complete the rotation by moving the engaging mechanism until a force of N pounds is encountered or the mechanism moves to the completely rotated position (see table 1, ROTATE IN/OUT COMPLETED for N and distance). Block 590 checks the status from the saturate axes and if the force was encountered, control transfers to block 592 to set the success flag. If the rotation was to the position, and the force was not encountered, control goes to block 594 to set a fail flag. In either case, control goes to block 596 to move the engaging mechanism back to the rest position, then block 598 sets the control system gains to standby before returning to the caller.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

| Operation ID | Control System Parameters | | | | | |
|---|---|---|---|---|---|---|
| | $V_p$ mm/s | Accel mm/s2 | Y_force lbs | Z_force lbs | DIST Eu's | Gain See Below |
| TRANSLATE SATURATE | 50 | 1000 | 18 | 5 | 600 | trans |
| CART REMOVAL | 1000 | 2000 | 18 | 9 | 425 | plunge |
| CART INSERT | 1000 | 2000 | 18 | 9 | 800 | plunge |
| ACCEPT TEST | 750 | 3000 | 14 | 14 | 1500 | plunge |
| DRIVE INSERT | 120 | 5720 | 18 | 12 | 57 | plunge |
| FLIP SATURATE | 100 | 250 | 20 | 10 | 500 | flip |
| TEST FOR CART IN CELL | 1000 | 2000 | 18 | 9 | 1750 | plunge |
| TEST FOR CART IN DRIVE AND TRANSPORT | 1000 | 2000 | 18 | 9 | 2480 | plunge |
| ROTATE IN JAM | 350 | 1000 | 18 | 13 | 4536 | plunge |
| ROTATE IN/OUT COMPLETED | 350 | 1000 | 18 | 9 | 567 | plunge |

$V_p$ is peak velocity allowable in millimeters per second.
Accel is the acceleration to use when ramping velocity up/down, in millimeters per second per second.
Y_force is the saturation threshold for the Y control system in pounds.
Z_force is the saturation threshold for the Y control system in pounds.
DIST is the maximum distance to travel during the saturate in encoder units. Encoder units are counts of feedback from the shaft encoder.
Gains are the control loop gains when performing the saturation, as described below.
    The gain numbers used for compensation in the control loops are:
    Y_kp is the value for $K_p$ in the Y control loop compensator.
    Y_kv is the value for $K_v$ in the Y control loop compensator.
    Z_kp is the value for $K_p$ in the Z control loop compensator.
    Z_kv is the value for $K_v$ in the Z control loop compensator.
    Units for $K_p$ are (PWM counter)/(Encoder Unit of Position).
    Units for $K_v$ are Milliseconds.
    All values are times 256, for scaling purposes.

Standby
Y_kp = 110
Y_kv = 2048
Z_kp = 110
Z_kv = 1664

Translate
Y_kp = 110
Y_kv = 2048
Z_kp = 55
Z_kv = 1792

Plunge
Y_kp = 220
Y_kv = 1357
Z_kp = 110
Z_kv = 1664

Flip
Y_kp = 220
Y_kv = 1357
Z_kp = 55
Z_kv = 2560

Vertical movement
Y_kp = 110
Y_kv = 2048
Z_kp = 110
Z_kv = 2048

What is claimed is:

1. In a cartridge handling system, a process for moving a transport of said handling system from a first location to a second location, comprising the steps of:
   (a) starting said moving;
   (b) measuring a force opposing said moving;
   (c) if said opposing force exceeds a first predetermined threshold, stopping said moving;

(d) if said opposing force exceeds a second predetermined threshold, greater than said first predetermined threshold, stopping said moving and indicating an error condition;

(e) measuring a distance traveled by said moving transport;

(f) stopping said moving if said distance traveled equals a difference in distance between said first location and said second location; and (g) repeating steps (b) through (f) until said transport is stopped by one of said steps (c), (d), or (f).

2. In a cartridge handling system, a process for moving a transport of said handling system in two directions from a first location to a second location, comprising the steps of:

(a) starting said moving;

(b) measuring a force opposing said moving in a Y direction;

(c) measuring a force opposing said moving in a Z direction;

(d) if said Y direction opposing force exceeds a first predetermined threshold, stopping said moving;

(e) if said Z direction opposing force exceeds a second predetermined threshold, stopping said moving;

(g) if said Y direction opposing force exceeds a third predetermined threshold, greater than said first predetermined threshold, stopping said moving and indicating an error condition;

(h) if said Z direction opposing force exceeds a fourth predetermined threshold, greater than said second predetermined threshold, stopping said moving and indicating an error condition;

(i) measuring a distance traveled by said moving transport;

(j) stopping said moving if said distance traveled equals a difference in distance between said first location and said second location; and (k) repeating steps (b) through (j) until said transport is stopped by one of said steps (d), (e), (g), (h) or (i).

3. In a cartridge handling system, apparatus for moving a transport of said cartridge handling system from a first location to a second location, said apparatus comprising:

means for starting said moving;

force measuring means for measuring a force opposing said moving;

first means for halting said moving whenever said force opposing said moving exceeds a predetermined threshold;

second means for halting said moving whenever said force opposing said moving exceeds an error threshold;

distance measuring means for determining a distance traveled by said transport; and means for halting said moving whenever said distance traveled equals a difference in distance between said first location and said second location;

whereby said transport movement is halted if said transport reaches said second location, or said force opposing said movement exceeds said predetermined threshold, or said force opposing said movement exceeds said error threshold.

4. In a cartridge handling system, apparatus for moving a transport of said cartridge handling system in two directions from a first location to a second location, said apparatus comprising:

means for starting said moving;

Y force measuring means for measuring a force opposing said moving in a first Y direction of said two directions;

Z force measuring means for measuring a force opposing said moving in a second Z direction of said two directions;

first means for halting said moving whenever said force opposing said moving in said Y direction exceeds a predetermined Y threshold;

second means for halting said moving whenever said force opposing said moving in said Z direction exceeds a predetermined Z threshold;

third means for halting said moving whenever said force opposing said moving in said Y direction exceeds a Y error threshold;

forth means for halting said moving whenever said force opposing said moving in said Z direction exceeds a Z error threshold;

distance measuring means for determining a distance traveled by said transport; and means for halting said moving whenever said distance traveled equals a difference in distance between said first location and said second location.

5. In a cartridge handling system having a control system for moving a transport of said cartridge handling system, apparatus for halting said movement comprising:

means for calculating a force being exerted by a motor of said control system;

first comparing means for comparing said force to a first predetermined values.

completion means responsive to said comparing means for halting said moving whenever said force exceeds said first predetermined value, and for indicating a normal completion;

second comparing means for comparing said force to a second predetermined values.

error means responsive to said second comparing means for halting said moving whenever said force exceeds said second predetermined value, and for indicating an error condition.

6. In a cartridge handling system having a Y control system and a Z control system for moving a transport of said cartridge handling system, a method for causing said transport to translate between first and second columns of said cartridge handling system, said method comprising the steps of:

(a) activating said Y control system and said Z control system to move said transport to a translate position thereby activating a lateral displacement latch of said cartridge handling system;

(b) altering a control system gain of said Z control system to a gain predetermined for a translate operation, whereby said control system gain is adjusted for inertia and resistance;

(c) moving said transport using said Z control system until a predetermined opposition force is encountered; and (d) maintaining said opposition force using said Z control system while moving said transport away from said translate position using said Y control system thereby deactivating said lateral displacement latch.

7. In a cartridge handling system having a Y control system and a Z control system for moving a transport of said cartridge handling system, a method for causing said transport to retrieve a cartridge stored in said cartridge handling system, said method comprising the steps of:

(a) activating said Y control system and said Z control system to move said transport to a position in front of a cell containing said cartridge;

(b) altering a control system gain of said Z control system to a gain predetermined for a retrieve operation, whereby said control system gain is adjusted for inertia and resistance;

(c) moving an engaging mechanism connected to said transport in a first direction toward said cartridge using said Z control system until a predetermined opposition force is encountered; and (d) moving said engaging mechanism using said Z control system in a direction opposite said first direction to remove said cartridge.

8. In a cartridge handling system having a Y control system and a Z control system for moving a transport of said cartridge handling system, a method for causing said transport to insert a cartridge into a cell of said cartridge handling system, said method comprising the steps of:

(a) activating said Y control system and said Z control system to move said transport to a position in front of said cell;

(b) altering a control system gain of said Z control system to a gain predetermined for an insert cell operation, whereby said control system gain is adjusted for inertia and resistance;

(c) moving an engaging mechanism connected to said transport in a first direction toward said cell using said Z control system until a predetermined opposition force is encountered;

(d) moving said engaging mechanism using said Z control system in a direction opposite said first direction to release said cartridge from said transport; and (e) testing said transport and reporting an error if said cartridge is not completely removed.

9. The method of claim 8 wherein step (e) further comprises the steps of:

(e1) altering said Y control system gain;

(e2) moving said transport in a first direction a small predetermined distance;

(e3) measuring any opposing force encountered during said moving; and (e4) returning an error condition if said force encountered exceeds a predetermined value.

10. In a cartridge handling system having a Y control system and a Z control system for moving a transport of said cartridge handling system, a method for causing said transport to insert a cartridge into an optical drive of said cartridge handling system, said method comprising the steps of:

(a) activating said Y control system and said Z control system to move said transport to a position in front of said drive;

(b) altering a control system gain of said Z control system to a gain predetermined for an insert drive operation, whereby said control system is adjusted for inertia and resistance;

(c) setting a count to zero;

(d) moving an engaging mechanism connected to said transport in a first direction toward said drive using said Z control system;

(e) Testing drive status information from said drive and proceeding with step (i) if said status indicates cartridge taken;

(f) testing an opposition force encountered by said Z control system, and proceeding with step (h) if said force exceeds a predetermined value;

(g) incrementing said count value and proceeding with step (d) if said count value is below a predetermined value;

(h) setting an error flag; and (i) moving said engaging mechanism using said Z control system in a direction opposite said first direction to release said cartridge from said transport.

11. In a cartridge handling system having cells and having a control system for moving a transport of said cartridge handling system, a method for flipping said cartridge about a horizontal axis of said transport, said method comprising the steps of:

(a) altering a control system gain of said control system from a standby gain to a new gain predetermined for said flipping, whereby said control system gain is adjusted for a rotate operation inertia and resistance;

(b) moving an engaging mechanism connected to said transport from an original position in a first direction away from said cells using said control system until a predetermined opposition force is encountered; and (c) restoring said control system gain of said control system to said standby gain.

12. In a cartridge handling system having a Y control system and a Z control system for moving a transport of said cartridge handling system, a method for determining if a cell in said cartridge handling system contains a cartridge, said method comprising the steps of:

(a) activating said Y control system and said Z control system to move said transport to a position in front of said cell containing said cartridge;

(b) altering a control system gain of said Z control system to a gain predetermined for a retrieve operation, whereby said control system gain is adjusted for inertia and resistance;

(c) moving an engaging mechanism connected to said transport in a first direction toward said cartridge using said Z control system;

(d) testing an opposition force encountered by said Z control system and proceeding with step (h) if said force does not exceed a predetermined value;

(e) setting a media present flag;

(f) moving said engaging mechanism away from said cell a predetermined amount, whereby said engaging mechanism is reset to allow said cartridge to be re-inserted;

(g) moving said engaging mechanism toward said cell using said Z control system until a predetermined opposition force is encountered; and (h) moving said engaging mechanism using said Z control system in a direction opposite said first direction a predetermined amount.

13. In a cartridge handling system having a Y control system and a Z control system for moving a transport of said cartridge handling system, a method for determining if said transport contains a cartridge, said method comprising the steps of:

(a) activating said Y control system and said Z control system to move said transport to a position in front of a test area, said test area being constructed such that a cartridge cannot be inserted therein;

(b) altering a control system gain of said Z control system to a gain predetermined for a cartridge insert operation, whereby said control system gain is adjusted for inertia and resistance;
(c) moving an engaging mechanism connected to said transport in a first direction toward said test area using said Z control system;
(d) testing an opposition force encountered by said Z control system and proceeding with step (f) if said force does not exceed a predetermined value;
(e) setting a transport full flag;
(f) moving said engaging mechanism using said Z control system in a direction opposite said first direction a predetermined amount.

14. In a cartridge handling system having a Y control system and a Z control system for moving a transport of said cartridge handling system, said cartridge handling system also having a movable mailslot with a projection thereon, a method of moving said mailslot from a forward position to a back position comprising the steps of:
(a) activating said Y control system and said Z control system to move said transport to a position adjacent said projection;
(b) activating said Y control system and said Z control system to engage a projection on said transport with said projection on said mailslot;
(c) altering a control system gain of said Z control system to a gain predetermined for a mailslot move, whereby said control system gain is adjusted for inertia and resistance;
(d) moving said engaging mechanism from an original position in a back direction using said Z control system until said engaging mechanism reaches a first predetermined location;
(e) testing an opposition force encountered by said Z control system and proceeding with step (h) if said force does not exceed a predetermined value;
(f) moving said engaging mechanism using said Z control system in a forward direction to said original position;
(g) setting a jammed flag and proceeding with step (m);
(h) moving said engaging mechanism in said back direction using said Z control system until said engaging mechanism reaches a second predetermined location;
(i) testing an opposition force encountered by said Z control system and proceeding with step (k) if said force does not exceed a predetermined value;
(j) setting a failure flag and proceeding with step (m);
(k) setting a success flag;
(l) moving said engaging mechanism using said Z control system in a forward direction to said original position; and
(m) restoring said control system gain to a standby gain.

15. In a cartridge handling system having a Y control system and a Z control system for moving a transport of said cartridge handling system, said cartridge handling system also having a movable mailslot with a projection thereon, a method of moving said mailslot from a back position to a forward position comprising the steps of:
(a) activating said Y control system and said Z control system to move said transport to a position adjacent said projection;
(b) activating said Y control system and said Z control system to engage a projection on said transport with said projection on said mailslot;
(c) altering a control system gain of said Z control system to a gain predetermined for a mailslot move, whereby said control system gain is adjusted for inertia and resistance;
(d) moving said engaging mechanism from an original position in a forward direction using said Z control system until said engaging mechanism reaches a first predetermined location;
(e) testing an opposition force encountered by said Z control system and proceeding with step (g) if said force exceeds a predetermined value;
(f) setting a failure flag and proceeding with step (h);
(g) setting a success flag;
(h) moving said engaging mechanism using said Z control system in a direction opposite said first direction to said original position; and
(m) restoring said control system gain to a standby gain.

* * * * *